United States Patent
Sheikh

(10) Patent No.: US 7,197,555 B1
(45) Date of Patent: Mar. 27, 2007

(54) DIRECTORY SERVER TRACKING TOOL

(75) Inventor: Attaullah Sheikh, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 09/660,931

(22) Filed: Sep. 13, 2000

(51) Int. Cl.
*G06F 15/16* (2006.01)
*G06F 15/173* (2006.01)

(52) U.S. Cl. .................... 709/224; 709/203
(58) Field of Classification Search ............ 709/223, 709/224; 707/9
See application file for complete search history.

(56) References Cited

U.S. PATENT DOCUMENTS

| | | | |
|---|---|---|---|
| 5,513,314 A | 4/1996 | Kandasamy et al. ... | 395/182.04 |
| 5,758,083 A | 5/1998 | Singh et al. ........... | 395/200.53 |
| 5,793,962 A * | 8/1998 | Badovinatz et al. ........ | 709/201 |
| 5,805,824 A | 9/1998 | Kappe ................... | 395/200.72 |
| 5,926,463 A | 7/1999 | Ahearn et al. .............. | 370/254 |
| 5,933,849 A | 8/1999 | Srbljic et al. ............... | 711/118 |
| 5,956,729 A | 9/1999 | Goetz et al. ................. | 707/104 |
| 6,085,238 A * | 7/2000 | Yuasa et al. ................. | 709/223 |
| 6,154,463 A * | 11/2000 | Aggarwal et al. ........... | 370/408 |
| 6,175,866 B1 * | 1/2001 | Holloway et al. .......... | 709/223 |
| 6,252,856 B1 * | 6/2001 | Zhang ......................... | 370/254 |
| 6,253,242 B1 * | 6/2001 | Rosenberg .................. | 709/224 |
| 6,321,270 B1 * | 11/2001 | Crawley ...................... | 709/238 |
| 6,366,913 B1 * | 4/2002 | Fitler et al. ..................... | 707/9 |
| 6,463,471 B1 * | 10/2002 | Dreke et al. ................. | 709/224 |
| 6,466,932 B1 * | 10/2002 | Dennis et al. ................. | 707/3 |
| 6,493,715 B1 * | 12/2002 | Funk et al. .................... | 707/10 |
| 6,539,425 B1 * | 3/2003 | Stevens et al. ............. | 709/220 |
| 6,539,427 B1 * | 3/2003 | Natarajan et al. ........... | 709/224 |
| 6,671,276 B1 * | 12/2003 | Bakre et al. ............. | 370/395.1 |
| 6,671,695 B2 * | 12/2003 | McFadden ................... | 707/102 |
| 6,732,160 B2 * | 5/2004 | Ambrosini et al. ......... | 709/218 |
| 7,089,211 B1 * | 8/2006 | Trostle et al. ................. | 705/51 |

OTHER PUBLICATIONS

W. Yeong, T. Howes, S. Kille, "RFC 1777—Lightweight Directory Access Protocol", Mar. 1995.*

* cited by examiner

*Primary Examiner*—Jason Cardone
*Assistant Examiner*—Thomas Duong
(74) *Attorney, Agent, or Firm*—Fitzpatrick, Cella, Harper & Scinto

(57) ABSTRACT

Tracking changes made in a directory server by establishing plural multicast groups for a respective plurality of change categories. Change information is submitted for multicast responsive to a change in the directory server, the change information being submitted to a selected one of the plural multicast groups, for multicast by the selected group, in correspondence to the category of the change. The change information may be submitted to the multicast group utilizing a connectionless protocol. Clients register with at least one of the plural multicast groups in order to obtain the change information.

26 Claims, 16 Drawing Sheets

DIRECTORY SERVER TRACKING TOOL

BACKGROUND OF THE INVENTION

1. Field of the Invention

The present invention relates to a software-based tool for tracking changes in a directory server. More particularly, the present invention relates to a tracking tool wherein change information is sent from a directory server to different ones of plural multicast groups based on the nature of the change, such that the change information is obtained by registered members of the multicast group.

2. Description of the Related Art

In a network computing environment, on-line directories such as a directory of printers have been an important tool for locating and organizing information. The directories are commonly contained on directory servers wherein a user accesses the server via a directory protocol, such as LDAP (Lightweight Directory Access Protocol) or NDAP (Novell Directory Access Protocol), to find information contained within the directory structure.

Information contained within the directory structure is often modified. For example, information within the directory structure is often added to, deleted from, changed or searched. To administer systems remotely, system administrators have a need to track such changes, so that their information on the system is current. Conventionally, administrators track changes occurring in the directory server by maintaining a direct network connection with the directory server at all times. When a change is made in the directory server, the administrator is notified of the change via his connection.

However, administrators often track changes for multiple directory servers simultaneously. Accordingly, the administrator must maintain a connection with all of the directory servers in order to obtain the change information from each server. As a result, the administrator's resources are tied up in server connections, thereby reducing the administrator's resource utilization efficiency.

Accordingly, what is needed is a directory server tracking tool that allows administrators to track changes made in directory servers without needlessly monopolizing network resources.

SUMMARY OF THE INVENTION

The present invention addresses the foregoing by providing a software-based tool for tracking changes on a directory server. According to the invention, a change information tracking tool tracks changes made in the directory server. The change information is multicast to different ones of plural multicast groups based on the nature of the change, such that the change information can be obtained by registered members of the multicast group.

Accordingly, in one aspect the invention tracks changes made in a directory server where plural multicast groups are established for a respective plurality of change categories. Change information is submitted for multicast responsive to a change in the directory server, the change information being submitted to a selected one of the plural multicast groups in correspondence to the category of the change.

Changes may be tracked by a tracking tool plug-in that activates when a change is made in the directory server. In response to a change in the directory server, an information packet is generated based on the type of change made. The information packet is then multicast to a group corresponding to the change type wherein registered members of the multicast group obtain the information packet.

In another aspect, clients obtain changes made in a directory server by registering as a member of at least one of a plurality of multicast groups, the plurality of multicast groups being established for a respective plurality of change categories. After registering, the clients receive a multicast transmission from one of the registered groups, the multicast transmission containing change information submitted to the multicast group in response to a change made in the directory server.

In the foregoing aspects, multiple multicast groups are first established, each group corresponding to a type of change made in the directory server. Clients who want to receive change information register as a member with each multicast group type that they are interested in receiving change information from. Then, when a change is made in the directory server, the change information is submitted to the multicast group corresponding to the change information type. Finally, the clients who have registered with the multicast group obtain the change information.

As a result of the foregoing, any client who is a registered member of a multicast group can obtain the change information without having to maintain a connection with the directory server. Additionally, each client can register with multiple multicast groups, thereby selecting which type of change information they wish to obtain. Furthermore, each client can register with multiple multicast groups for multiple directory servers. Therefore, a client can track any or all changes made to multiple directory servers without having to maintain a connection to each of the directory servers.

In another aspect, the invention may use a connectionless protocol such as User Datagram Protocol (UDP) to submit the change information to the multicast groups. Use of a connectionless protocol somewhat reduces the amount of traffic across the network.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

System Overview

Figure 1:
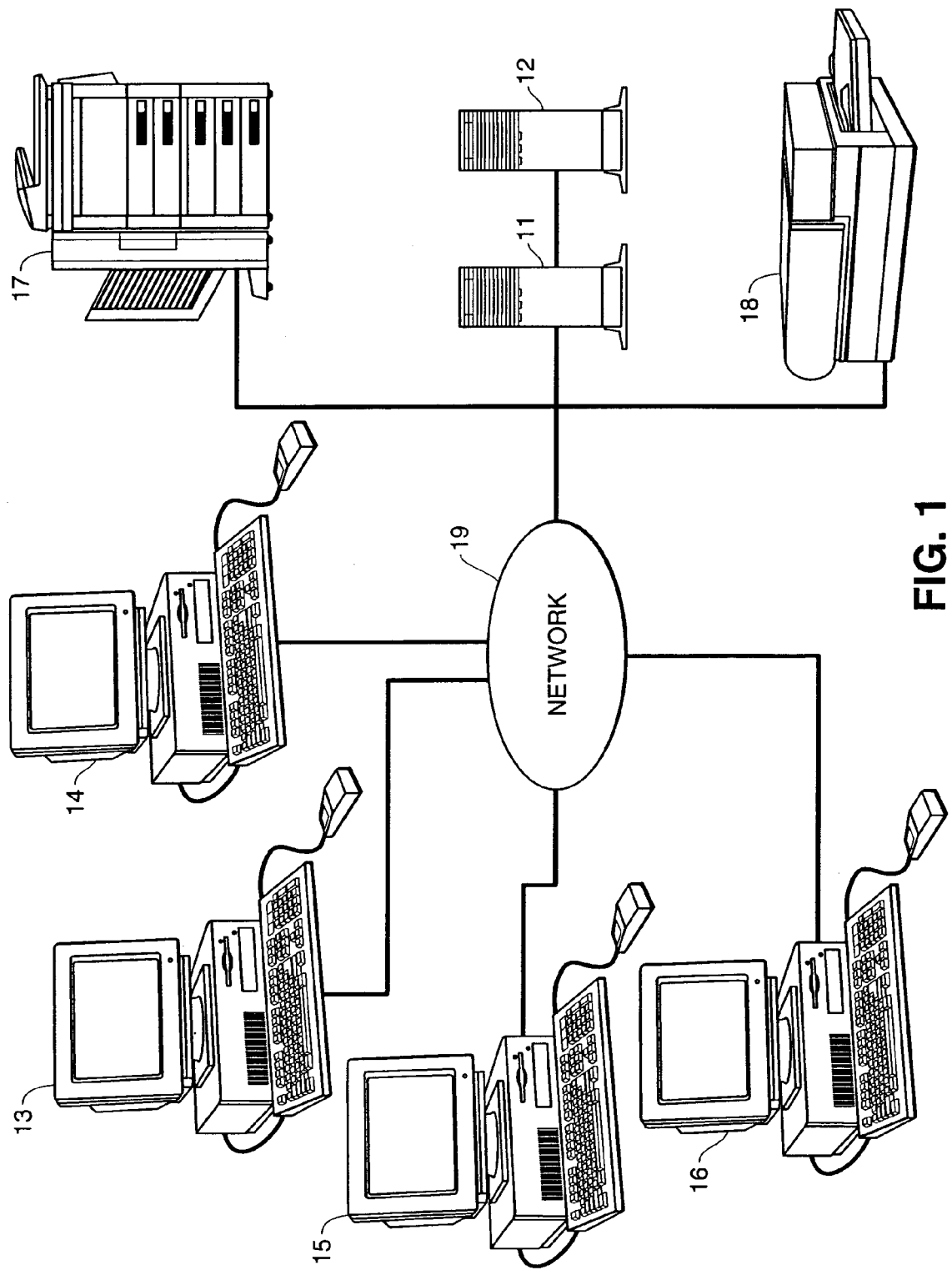
FIG. 1 depicts a network environment in which the invention may be employed.

FIG. 1 depicts a network environment in which the invention may be employed. As seen in FIG. 1, network 10 may include servers 11 and 12, clients 13 and 14, client/administrators 15 and 16, and peripheral devices 17 and 18 connected via network connection 19. Network connection 19 may be a local area network (LAN), a wide area network (WAN), or any other type of network in which multicasting may be employed. Multicasting as used in the practice of the invention is defined as the transmission of information to a multicast network address such that clients who register with the multicast network address receive the information. In this regard, the invention is preferably employed in a system that performs multicasting utilizing a TCP/IP protocol. However, the invention is not limited to systems that utilize TCP/IP and may be employed in systems that perform multicasting utilizing other protocols.

Clients 13 and 14 and client/administrators 15 and 16 are preferably computer workstations attached to network connection 19. They may be, for example, IBM-compatible personal computers, Macintosh personal computers, UNIX workstations, Sun MicroSystems workstations, or any other type of workstation. Clients 13 and 14 and client/administrators 15 and 16 include an LDAP client application program that allows users to make changes in a directory server application (hereinafter referred to as directory server) in servers 11 and 12. Some examples of directory server application programs are Microsoft Active Directory Server, Netscape Directory Server and Novell Directory Server. The LDAP client application program communicates with the directory server running in servers 11 and 12 via network connection 19. Communication between clients 13 and 14 and client/administrators 15 and 16 with the directory server in servers 11 and 12 will be described in more detail below with regard to FIG. 3. Additionally, the LDAP client application program receives and processes multicast messages that are multicast by a plug-in of the directory server in servers 11 and 12. In this regard, one difference between clients 13 and 14 and client/administrators 15 and 16 may be that the LDAP client application in clients 13 and 14 may be configured to only allow users to make changes in the directory server in servers 11 and 12 and not to receive multicast messages, whereas, the LDAP client in client/administrators 15 and 16 may be configured to either only receive multicast messages or to receive multicast messages and to allow users to make changes in the director server in servers 11 and 12.

It should be noted that the LDAP client application in clients 13 and 14 and client/administrators 15 and 16 need not correspond to the directory server application in servers 11 and 12 in order for the LDAP client application to make changes in the directory server in servers 11 and 12. For instance, if the directory server application in servers 11 and 12 is Netscape Directory Server, any LDAP client application in clients 13 and 14 and client/administrators 15 and 16 could be utilized to make changes in the Netscape Directory Server and the LDAP client does not have to be a Netscape Directory Server LDAP client. Thus, any LDAP client can be utilized to make changes in the directory server application of servers 11 and 12.

Moreover, the LDAP client application running in clients 13 and 14 and client/administrators 15 and 16 is not the only way to make changes in the directory server of servers 11 and 12. Changes could also be made via a native application in servers 11 and 12 themselves. Additionally, changes could be made by an embedded LDAP client within a device on the network, including an embedded LDAP client within peripheral devices 17 and 18. Accordingly, the invention does not require that changes be made in the directory server by an LDAP client application in clients 13 and 14 and client/administrators 15 and 16 and the invention may be implemented in a directory server regardless of how the changes are made.

As stated above, the LDAP client application can be setup to allow a user to make changes in the directory server, to receive multicast messages, or both. Thus, although FIG. 1 shows separate clients (13 and 14) and client/administrators (15 and 16), the invention could be employed with only one computer workstation rather than the four shown in FIG. 1. However, for clarity, FIG. 1 depicts separate clients and client/administrators where clients 13 and 14 are setup to only allow a user to make changes in the directory server of servers 11 and 12 and not to receive multicast messages, and client/administrators 15 and 16 are setup to only receive multicast messages and not to allow a user to make changes in the directory server of servers 11 and 12.

Figure 2:
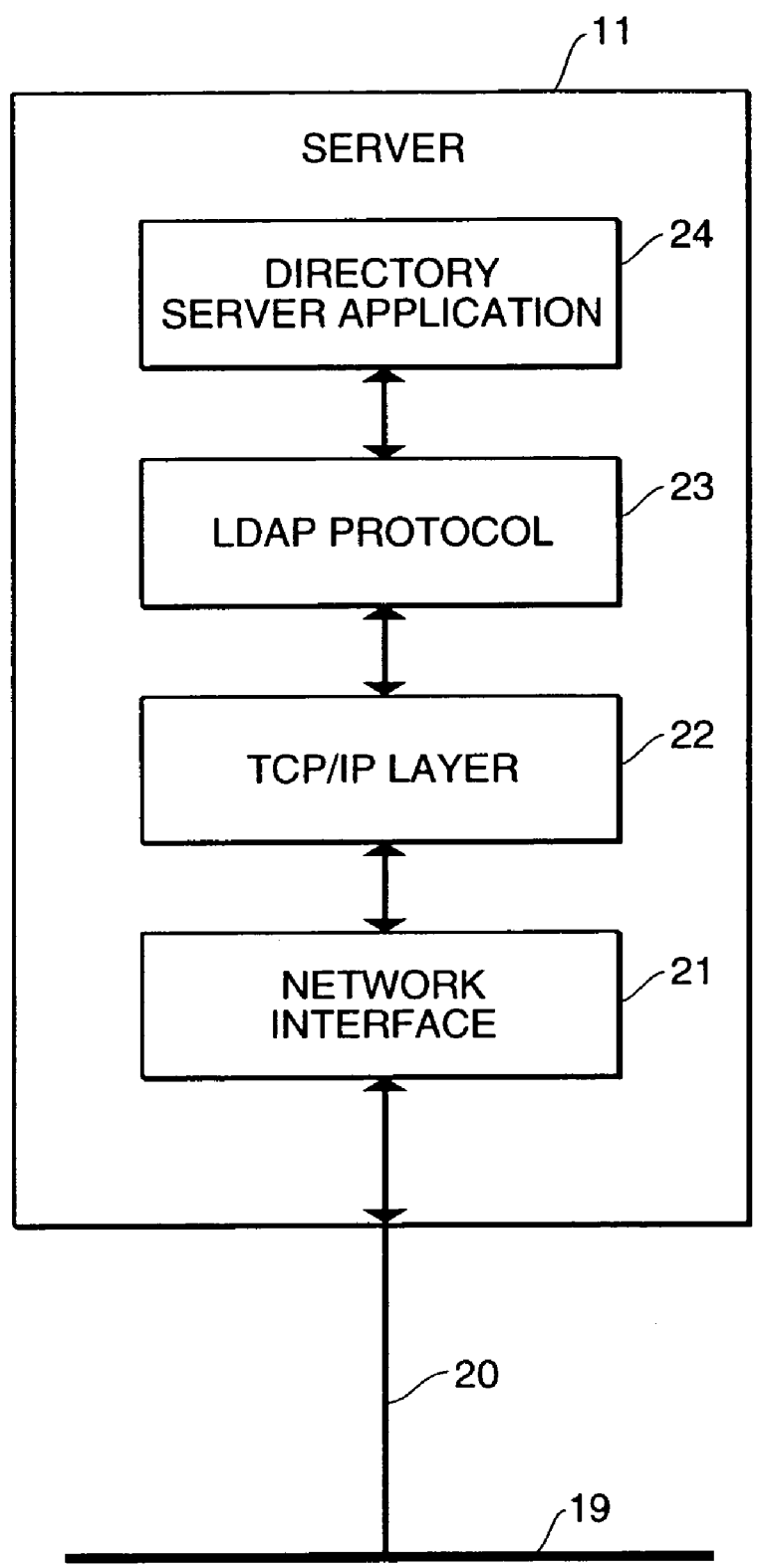
FIG. 2 depicts an internal architecture of a directory server.

FIG. 2 depicts a more detailed view of the internal architecture of server 11. Server 12 may be similar to server 11 and for brevity, only server 11 will be discussed. Server 11 may be a server such as a Compaq Prosignia server or any other type of server. However, server 11 does not have to be a server per se, but may be any computer that is capable of running a directory server application program. As shown in FIG. 2, server 11 is connected to network connection 19 by connection 20 which is interfaced to network interface 21. Network interface 21 is preferably a network card which controls transmission and reception of information by server 11 over the network. Interfaced with network interface 21 is TCP/IP layer 22. As previously stated, TCP/IP is the preferred protocol for multicasting according to the invention, but any other protocol could be used instead. For a better understanding of multicasting using TCP/IP, consider the following.

There are generally three different categories of IP addresses: communication, broadcast and multicast. Each of these three categories are assigned a particular range of IP addresses. For communication, a range of IP addresses are assigned that are utilized to specifically identify each device on the network. For example, each device attached to the network shown in FIG. 1 would be assigned a different IP address that identifies that device on the network. Each device may be manually assigned an IP address that it maintains, or an IP address may be automatically assigned by an application program each time the device is connected to the network.

For broadcasting, generally only one IP address is assigned. Messages transmitted to the broadcast address are received by all IP devices on the network.

For multicasting, a range of IP addresses are assigned in which messages transmitted to one of the IP addresses are received only by members who have registered with the IP address. Unlike the communication IP addresses, the IP addresses in the multicast range are not assigned to a device. Rather, they are virtual addresses that represent a multicast group that receives messages sent to it and then distributes the received messages to members who have registered with the group. Thus, according to the invention, messages are multicast by a plug-in in the directory server to a designated multicast group where they are distributed to registered members of the group.

Returning to FIG. 2, interfaced to TCP/IP layer 22 is LDAP protocol layer 23. LDAP protocol layer 23 provides for communication between the LDAP client application of clients 13 and 14 and client/administrators 15 and 16 with a directory server application 24 in server 11. Directory server 24 is preferably a directory server application such as Netscape Directory Server, Microsoft Active Directory Server or Novell Directory Server, but may be any other directory server application. Thus, utilizing the LDAP protocol, an LDAP client application can make changes in a directory server, such as directory server 24.

When a user working at clients 13 or 14 wants to make a change in directory server 24, the LDAP client establishes communication with server 11 via network connection 19. The communication traverses network interface 21, TCP/IP layer 22, LDAP protocol 23 and directory server 24 to provide the LDAP client with an interface to make changes in directory server 24. Once a change has been made, according to the invention, directory server 24 calls a plug-in corresponding to the type of change, whereby the plug-in generates an information packet and multicasts the information packet to a designated multicast group. The process of a plug-in being called, generating a change information packet and multicasting it to a designated multicast group are described in more detail below with reference to FIG. 4.

Returning to FIG. 1, also connected to network 19 are peripheral devices 17 and 18 which may be any type of peripheral device that can be connected to the network. For instance, peripheral devices 17 and 18 may be printers, network copiers, routers, computer workstations, facsimiles, servers, or any other type of peripheral device. As stated above, peripheral devices 17 and 18 may include an embedded LDAP client. When a change is made in the configuration of either of peripheral devices 17 or 18, the embedded client may establish communication with server 11 and make a change in directory server 24. Additionally, when a new device is added to the network, the embedded LDAP client may make a change in directory server 24 to add the new device. Of course, peripheral devices 17 and 18 are not required to have an embedded LDAP client and a user could make changes in directory server 24 utilizing the LDAP client of clients 13 or 14 to add the new devices or to make changes in the configuration of existing devices in directory server 24.

Peripheral devices are an example of one item that is frequently changed on a network. For instance, new peripheral devices are often added to the network and existing devices are often removed or upgraded. As such, changes in peripheral devices connected to the network are one item that a network administrator may want to keep track of. However, it should be noted that peripheral devices are not required for practicing the invention and the invention may be employed in systems with directories that do not include any peripheral devices, but which may only contain virtual objects such as user names, service provider names, etc.

Directory Tracking Tool Architecture

Figure 3:
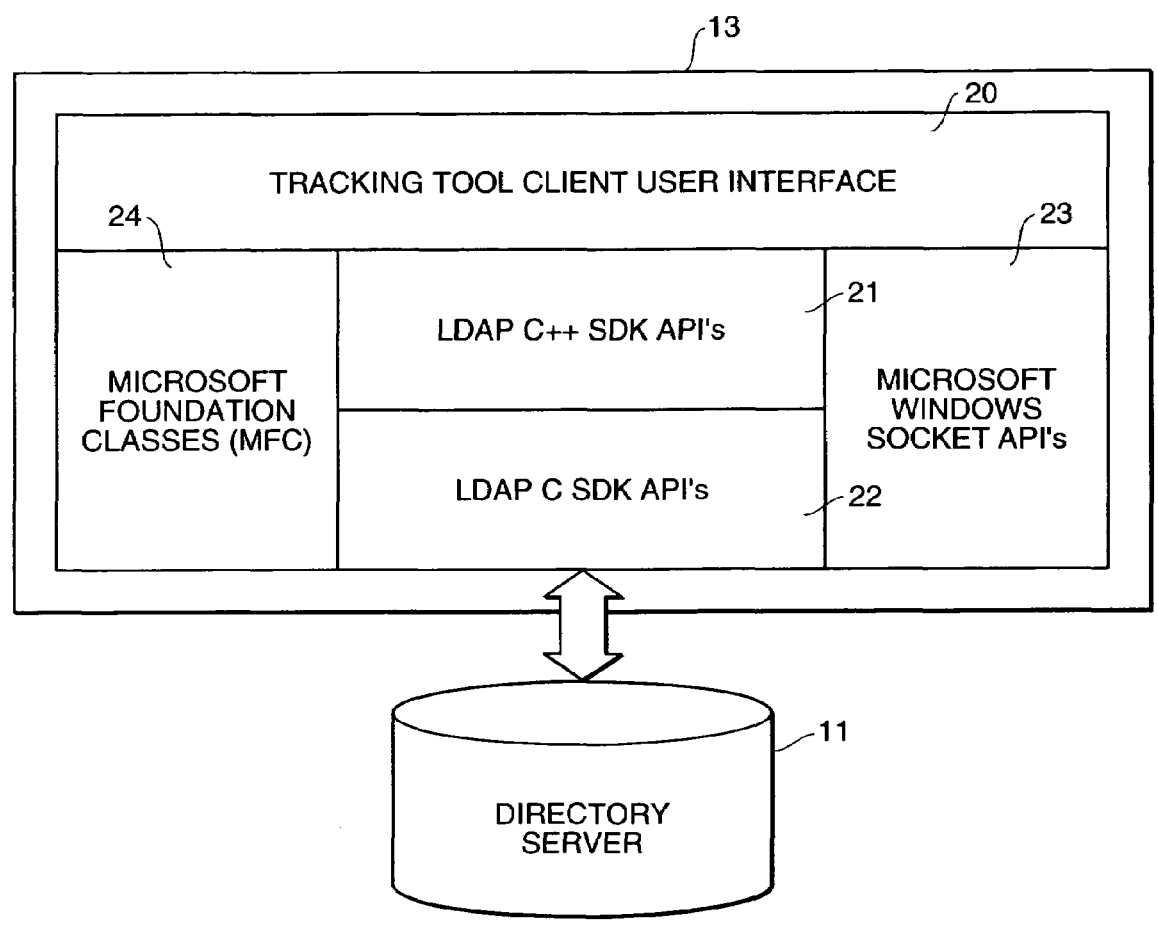
FIG. 3 depicts an example of an architecture for a client module.
Figure 4:
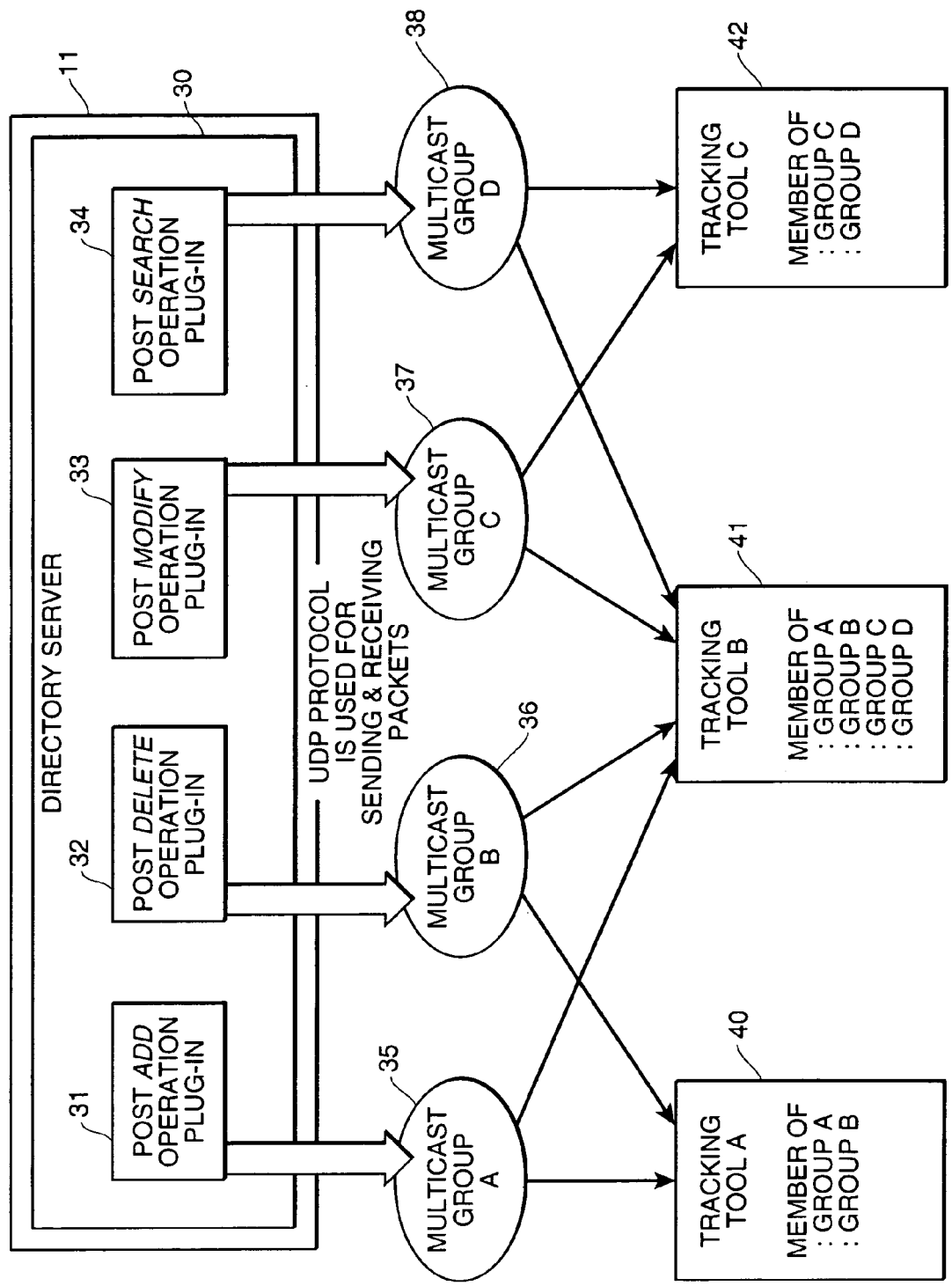
FIG. 4 depicts an example of an architecture and flow of multicast messages in a directory server.

FIG. 3 depicts an example of an architecture of an LDAP client application and FIG. 4 depicts an example of an architecture of a directory server application utilizing plug-ins according to the invention. The architecture of the LDAP client of FIG. 3 generally comprises two modules: one module for reading and writing information about objects to the directory server, and the other module for receiving multicast packets. The architecture of FIG. 4 generally comprises plug-ins generating information packets about changes made in the directory server and multicasting the information packets to registered members of a multicast group.

FIG. 3 depicts an example of an LDAP client architecture as it may be implemented in an existing directory server LDAP client application program running in client 13. As seen in FIG. 3, the LDAP client implements three main components for communicating with directory server 24: tracking tool user interface 20, an LDAP C++ SDK 21 (Lightweight Directory Access Protocol Software Development Kit Application Programming Interface) and an LDAP C SDK API's 22 of the existing directory server application. In a case where the LDAP program is Netscape Directory Server, Netscape's LDAP C SDK API's would be utilized. The tracking tool interface implements the C++ LDAP SDK for interfacing with the existing application's LDAP C SDK API's. The C++ LDAP SDK API's includes an exposed API which the tracking tool uses for performing operations on the directory server. The C++ LDAP SDK then calls the existing applications LDAP SDK API's for actually performing the operations. The C++ LDAP SDK parses the result, which makes it easier for the tracking tool. If an error occurs in the C++ LDAP SDK, it displays the error rather than making the tracking tool handle the problem.

The tracking tool also utilizes Microsoft Foundation Classes for displaying the directory structure once communication has been established with the directory server by the LDAP client. Additionally, the tracking tool utilizes the windows socket for receiving multicast messages. The windows socket is part of the second module and will be discussed in more detail below.

In the operation of the first module, a schema should be present in the directory server for objectclasses that are being added. A network administrator would normally create the schema in the directory server when the directory server is initially setup. Additionally, a user performing operations in the directory server should have sufficient access rights in order to make any changes in the directory server. Access rights may be provided by the network administrator on a user-by-user basis or a set of access rights may be assigned to a group of users. When a user logs-on to the system, they are required to enter a username (or authentication ID) and password. When the user logs-on, those users who do not have sufficient access rights are not able to make any changes in the directory server. The network administrator could also provide an anonymous user that is provided with sufficient rights so that any user could log-on as the anonymous user and make changes in the directory server, thereby avoiding having to provide authentication identification or a password.

The second module of the architecture shown in FIG. 3 provides for the tracking tool utilizing Microsoft Windows Socket API's. The tracking tool uses the Windows socket to register as a member of a multicast group. Thus, for each type of change information packet that is to be generated and multicast by the plug-ins in the directory server, the tracking tool registers a Windows socket with the multicast group so that messages received by the multicast group will then be forwarded to the registered member.

FIG. 4 depicts an example of an architecture of a messaging system and flow of multicast messages from server 11 to clients that have registered as members of at least one multicast group. The messaging system preferably uses a plug-in feature of the directory server application program. That is, when a change is made in the directory server, the directory server calls a plug-in which generates a multicast information packet and multicasts it to a multicast group. However, a plug-in is not required and any other implementation of the tracking tool which generates multicast information packets and multicasts them to a corresponding multicast group could be employed. For the present example, however, plug-ins will be discussed, and in particular, plug-ins that are supported as part of Netscape Directory Server will be described.

As seen in FIG. 4, four types of plug-ins may be implemented in Netscape Directory Server 30: ADD plug-in 31, DELETE plug-in 32, MODIFY plug-in 33, and SEARCH plug-in 34. One type of plug-in supported by Netscape Directory Server are post-operation plug-ins. As such, each of the foregoing plug-ins for Netscape Directory Server 30 are preferably implemented as a post-operation plug-in. A post-operation plug-in is one in which, after an operation has been performed (i.e. post-operation), the appropriate plug-in is called. Accordingly, when a change is made in the directory server, the directory server calls the appropriate plug-in corresponding to the type of change made. That is, if a new object was added in the directory server, then the directory server would call an ADD plug-in. When the ADD plug-in is called, it generates an information packet about the change and multicasts it to a multicast group corresponding to the type of change, whereby registered members of the multicast group receive the information packet.

To send the information packet by multicasting, multicast addresses corresponding to each of the plug-ins are established. As such, each plug-in has a corresponding multicast address that it sends the information packet to. For example, as seen in FIG. 4, ADD plug-in 31 sends information packets to multicast group 35 that is designated to receive the ADD information multicast packets. Likewise, DELETE plug-in 32 has corresponding multicast group 36, MODIFY plug-in 33 has corresponding multicast group 37 and SEARCH plug-in 34 has corresponding multicast group 38. An example of multicast IP addresses for each of the foregoing multicast groups may be as follows:

| Operation/Multicast Group | IP Address |
|---|---|
| ADD Operation (multicast group 35): | 225.6.7.8 |
| DELETE Operation (multicast group 36): | 225.6.7.9 |
| MODIFY Operation (multicast group 37): | 225.6.7.10 |
| SEARCH Operation (multicast group 38): | 225.6.7.11 |

When changes are made in the directory server by the LDAP client, the plug-in generates an information packet and multicasts the packet over the network to its corresponding multicast IP address.

In order to receive the multicast messages, the client registers as a member of each multicast group corresponding to the type of change information packet that it is to receive. For example, as seen in FIG. 4, client 41 registers as a member of multicast groups 35 and 36. Therefore, it receives multicast messages corresponding to ADD and DELETE operations performed in directory server 30. Client 41 registers with multicast groups 35, 36, 37 and 38 and therefore receives multicast messages about ADD, DELETE, MODIFY and SEARCH operations performed in directory server 30. Client 42 registers as a member of multicast groups 37 and 38 and therefore only receives multicast messages relating to MODIFY and SEARCH operations performed in directory server 30.

Thus, as described in this section, an LDAP client interfaces with the directory server to make changes in the directory server, the directory server calls a plug-in corresponding to the type of change made, the plug-in generates a post-operation information packet and multicasts it over the network to a multicast group corresponding to the type of change, and clients who have registered with the multicast group receive the multicast message. A more detailed description of the functionality of each of these will now be provided.

Functional Description

A description of the various functions performed in each of the LDAP client application and the directory server described above will now be provided with regard to FIGS. 5 to 10. The following description provides a more detailed description about a user making changes in a directory server utilizing either an LDAP client application or a native application, and setting options in a client for receiving messages multicast by the plug-in of the directory server.

A user wanting to make changes in the directory server may utilize the LDAP client application like that described above with regard to FIG. 3. The user activates the LDAP client application and selects an option to connect to a directory server. Alternatively, the LDAP client could be configured to automatically establish communication with a selected directory server when the client is activated. In a case where automatic communication has not been set, the user configures the directory server that communication is to be established with. For configuring the directory server, the LDAP client may display a window such as server configuration window 50 shown in FIG. 5.

Figure 5:
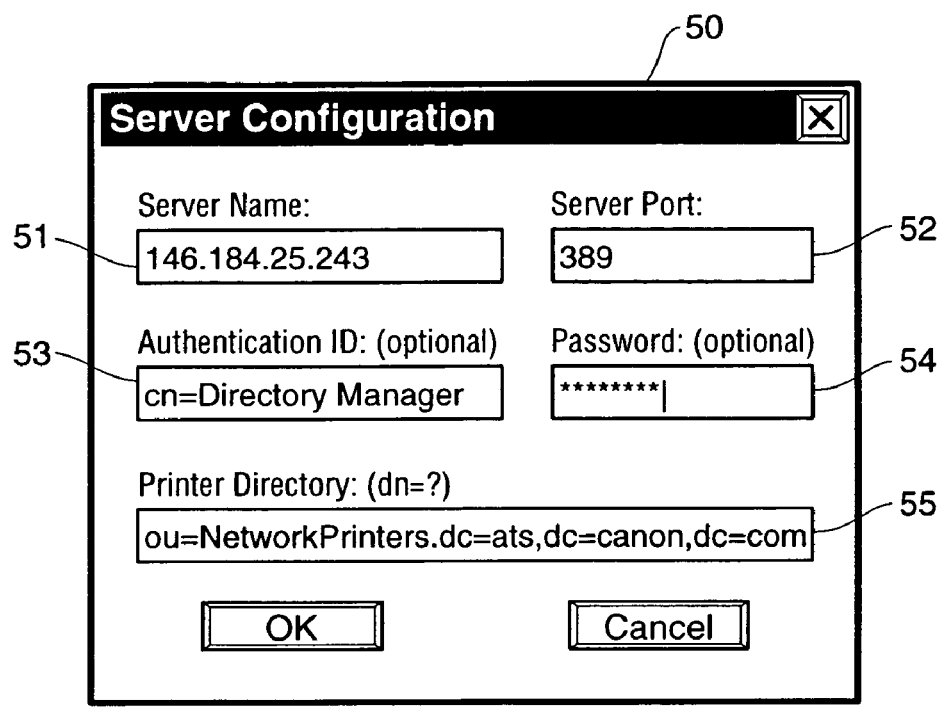
FIG. 5 depicts a window of a client side application program for configuring a directory server.

As seen in FIG. 5, server configuration window 50 may include various boxes for the user to enter information for configuring the server. For instance, server configuration window 50 may include box 51 for the user to enter the server name, box 52 for the user to enter the server LDAP port, box 53 for the user to enter the server authentication identification, box 54 for the user to enter a password and box 55 for the user to enter a specific directory in the directory server that he wants to make changes to.

The server configuration information is stored in a DirClient.ini file of the LDAP client which the LDAP client uses for reading and writing to the directory server. The LDAP client saves the last server configuration information to the DirClient.ini file before the application shuts down. Therefore, whenever a user wants to make changes to a directory server different from the last directory server for which configuration information has been saved, server configuration information of the new directory server is entered and saved in the DirClient.ini file before the changes are made. It should be noted that if the LDAP client is setup to only receive multicast messages and not to allow a user to make changes in the directory server, the server configuration step can be omitted.

Figure 10:
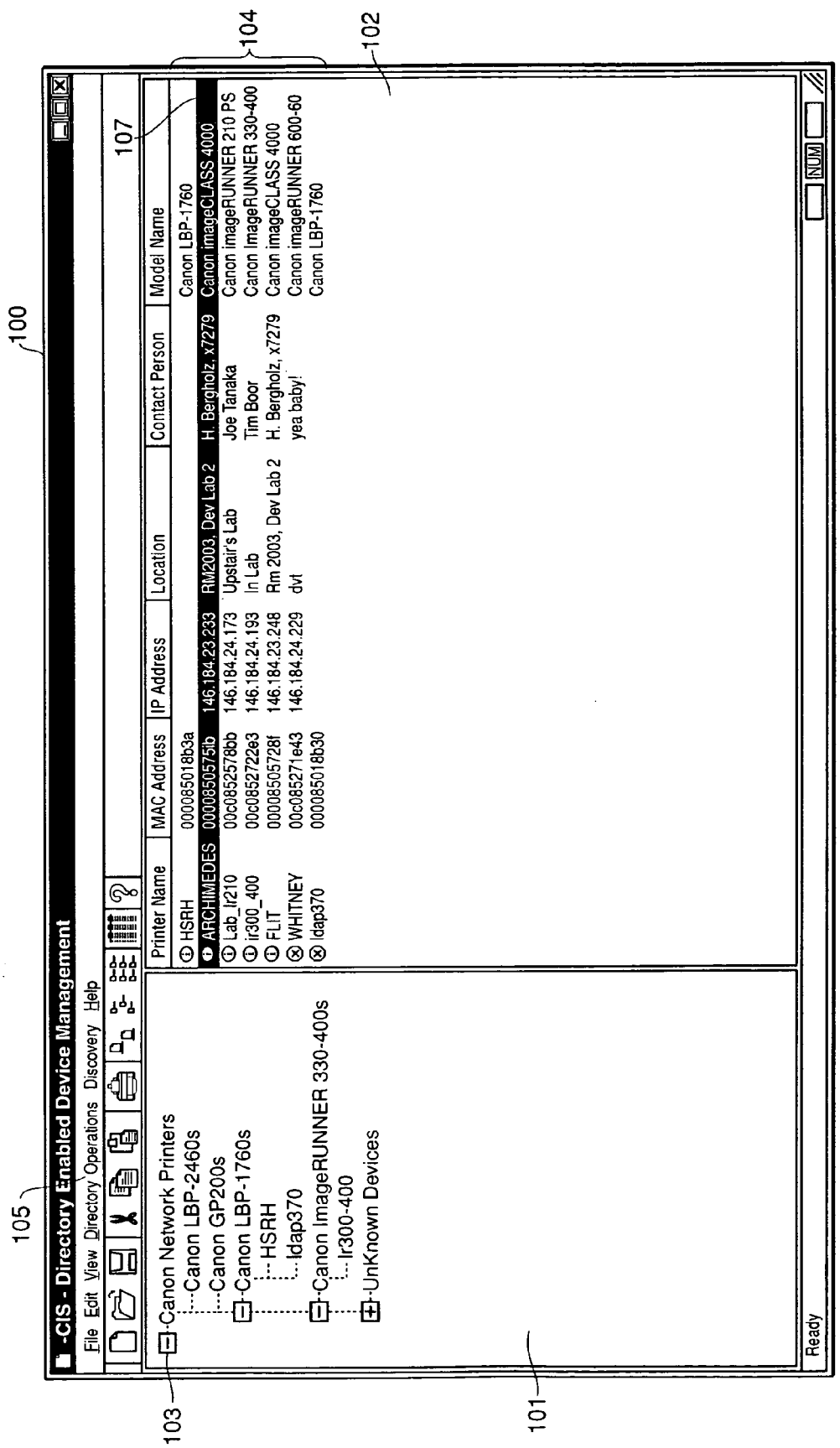
FIG. 10 depicts a window of an LDAP client application showing Canon network printer objects in the directory server.

Once the server configuration has been entered and saved, the LDAP client establishes communication with the directory server. The LDAP client, utilizing the Microsoft Foundation Classes, depicts the directory server objectclass and object information. For example, after server configuration settings have been entered as described with regard to FIG. 5, the LDAP client establishes communication with the directory server and opens a new window, such as window 100 shown in FIG. 10. As seen in FIG. 10, window 100 depicts the directory server (ou=NetworkPrinters, dc=ats, dc=canon, dc=com) that was configured in FIG. 5. Window 101 of window 100 depicts the selected objectclass of the directory server and window 102 depicts each object contained within the selected objectclass. Window 100 also provides an interface for the user to perform changes, i.e. edit, the directory server. That is, the user utilizes window 100 to perform ADD, DELETE, MODIFY or SEARCH operations in the directory shown in windows 101 and 102.

Figure 11:
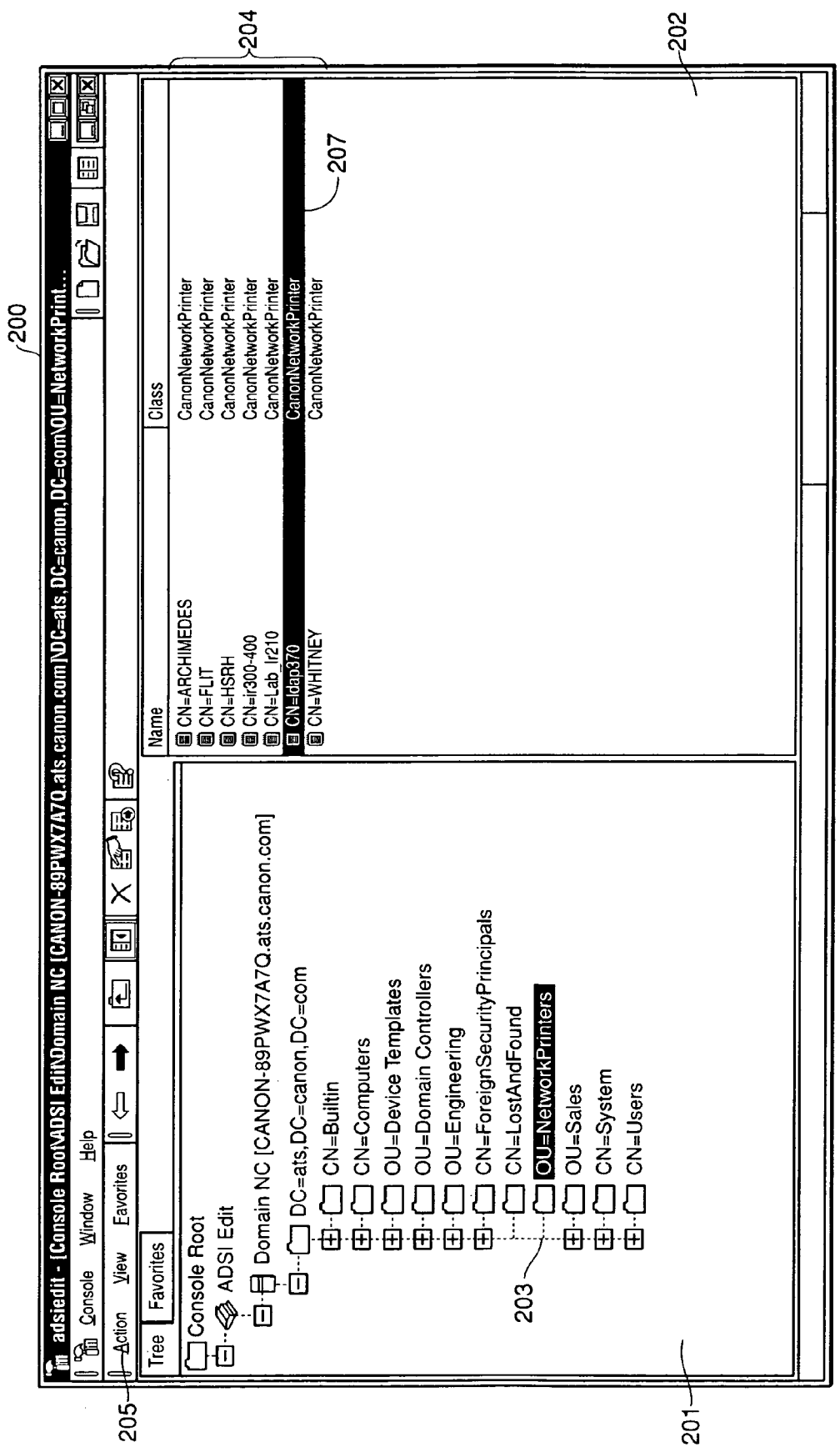
FIG. 11 depicts a window of native application showing a directory structure in a directory server.

Rather than accessing the directory server with the LDAP client as described above, the directory server could be accessed by a native application in the server. FIG. 11 depicts a window 200 that may be displayed if the directory server is accessed with a native application. The directory server depicted in window 200 is for the same directory server accessed above utilizing the LDAP client. As seen in FIG. 11, window 201 depicts the entire directory server rather than just the selected portion that was accessed with the LDAP client. That is, in FIG. 10, window 101 depicted only the selected objectclass ou=NetworkPrinters of the directory server, but window 201 of FIG. 11 depicts all objectclasses of the directory server, including the objectclass ou=NetworkPrinters. As shown in FIG. 11, when the objectclass ou=NetworkPrinters is selected, i.e. highlighted, all of the objects contained within the selected objectclass are depicted in window 202. For instance, selection of objectclass 203 (OU=NetworkPrinters) in window 201 results in depiction of listing 204. A comparison of listing 204 of FIG. 11 and listing 104 of FIG. 10 clearly shows that the objects are the same.

Utilizing an LDAP client application, changes in the directory server utilizing window 100 can performed in various ways. One way is by a user selecting Directory Operations pull-down menu 105. Upon selecting pull-down menu 105, various directory operations which may be performed are displayed. For instance, the pull-down menu may provide options for a user to add a new object, or to delete or modify an existing object. Upon selecting one of the directory operations from the pull-down menu, a new window may be activated and displayed for the user to perform the change. A description of a user making various changes will be provided below.

Alternatively, in the LDAP client the user may highlight an objectclass depicted in window 101 or an object in 102 using a pointing device, such as a mouse. Upon highlighting the desired objectclass or object, the user could perform a right click on the mouse to activate a cascading window that includes the various directory operations. From the cascading window, the user could select one of the options to be performed.

If a change is to made utilizing the native application depicted in FIG. 11 rather than the LDAP client depicted in FIG. 10, a somewhat similar operation is performed. For instance, a user could select Action button 205 with a mouse. Upon selecting Action button 205, a cascading drop down menu is displayed that provides the user with various directory operation options, including ADD, DELETE, MODIFY and SEARCH. Alternatively, rather than selecting Action button 205, the user could highlight an objectclass or object in windows 201 or 202 and click on the right mouse button (or any other button for which a pointing device provides for displaying additional options) which results in a cascading window that provides similar options.

It should be noted that the directory operation options provided by buttons 105 and 205 may be dictated by whether the highlighted object is an objectclass or an object. In more detail, it may be permissible to delete objects from an objectclass, but not permissible to delete an objectclass while it still contains objects. In the former case, a user is permitted to perform DELETE and MODIFY operations on a selected object and therefore, selecting an object depicted in window 102 or 202 may result in a cascading window that includes DELETE and MODIFY options. However, in the latter case, a user may not be permitted to delete objectclass 103 or 203 while it still contains any of the objects listed in listing 104 or 204, respectively. As such, highlighting objectclass 103 in FIG. 10 may result in a cascading window that does not provide an option to perform a DELETE operation. Further, objects are generally only added to objectclasses and therefore, selecting object 107 or 207 may result in a cascading window that does not provide for an ADD operation to be performed. Accordingly, the directory operations provided in the cascading menu may be determined based on whether the highlighted object is an objectclass or an object.

A description will now be made of a user performing ADD, DELETE and MODIFY operations in the directory server. The description includes changes made both with an LDAP client and with a native application.

Utilizing an LDAP client as shown FIG. 10, when a user wants to add an object to the directory server, the user selects directory operation button 105 which includes an ADD option to add a new object to the objectclass Canon Network Printers. Upon selecting the ADD option, a window such as window 60 shown in FIG. 6 may be depicted. Window 60 in FIG. 6 is an example of a window that may be displayed for adding an object to an objectclass via the LDAP client.

Figure 6:
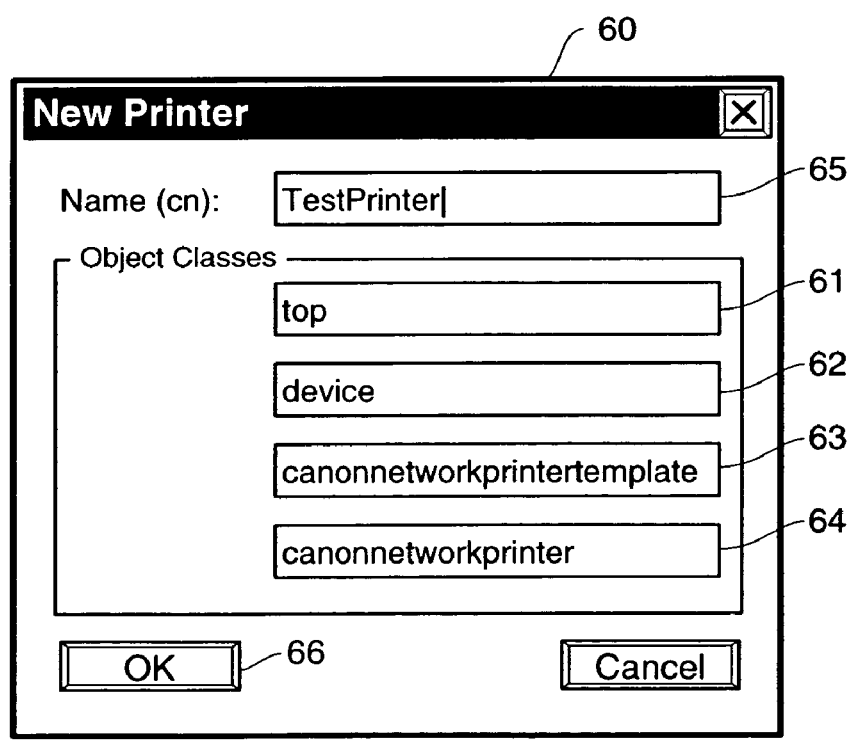
FIG. 6 depicts a window of a client side application program for adding an object to a directory in a directory server.

As seen in FIG. 6, boxes 61 to 64 are greyed out meaning that they are required fields that are automatically filled in and cannot be changed. The information for these fields are required attributes of all objects contained within that objectclass and are specified in the schema of the objectclass that the object is being added to. That is, when objectclass 103 was created, a schema was created for objectclass 103 that includes all required attributes for each object to be contained within objectclass 103. Therefore, when a new object is added to objectclass 103, the schema and required attributes are obtained and automatically entered into fields 61 to 64. The schema is fetched from the directory server by the LDAP client using an LDAPSchema object and then all parent objectclasses are retrieved from the LDAPSchema object. Therefore, in a case where a new objectclass is being added rather than an object, boxes 61 to 64 would not be greyed out and the user would have to enter the required attributes for the new objectclass. In the present case however, since boxes 61 to 64 are already filled in, the user only has to enter the object's name in box 65 and select OK button 66.

Figure 12:
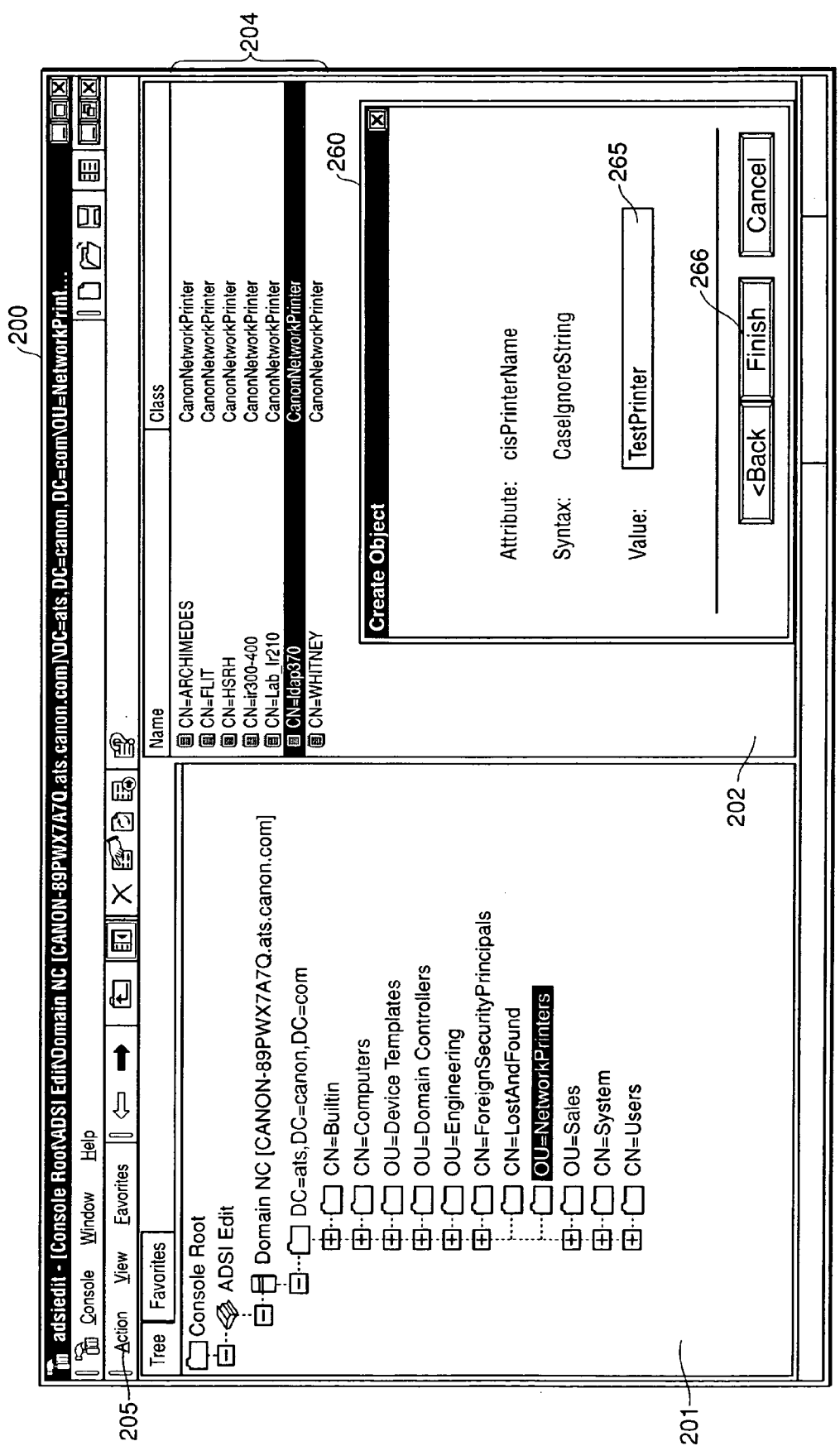
FIG. 12 depicts the window of FIG. 11 with a window for a user to perform an ADD operation in the directory server.

When a user wants to make a change to add a new object in the directory server utilizing the native application of FIG. 11, the user selects Action button 205 which depicts a cascading menu of directory operation options, including an ADD option. Upon selecting the ADD option, another window 260, as seen in FIG. 12, may be depicted for adding a new object. Similar to the description of FIG. 6, the required attributes of the object are fetched from the schema, and therefore it is not necessary to display them in window 260 and boxes 61 to 64 can be omitted. As such, the user merely enters the object's name in box 265 to add the new object. Once the user enters the object's name, he selects Finish button 266 to complete the change.

A DELETE operation could be performed by the user in a somewhat similar manner for both the LDAP client and the native application. With regard to the LDAP client shown in FIG. 10, the user could highlight an object that he wants to delete, such as object 107. Then, the user could select Directory Operations button 105 to activate the cascading menu and select a DELETE option. Selecting the DELETE option may provide a confirmation step for the user to confirm that he actually wants to delete the object before the object is actually deleted. This provides a safeguard against an inadvertent deletion of objects. Of course, the user could also right click on the mouse after having highlighted object 107 and select a DELETE option from the cascading menu activated by the mouse.

Similarly, in FIG. 11, the user could highlight object 207 and select Action button 205 or right click on the mouse. Then, the user could select a DELETE option from the cascading menu provided by selecting Action button 205 or right clicking on the mouse.

Figure 7:
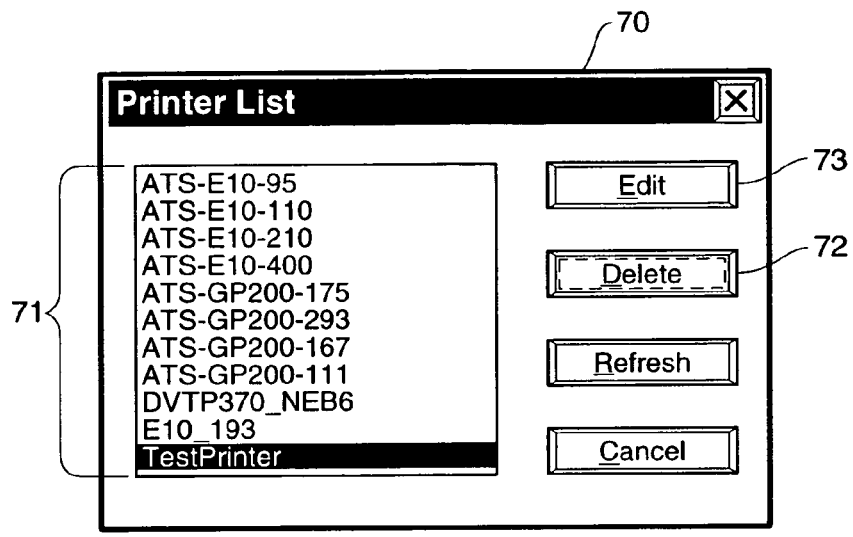
FIG. 7 depicts a window of a client side application program for searching, editing and deleting an object in a directory of a directory server.
Figure 8:
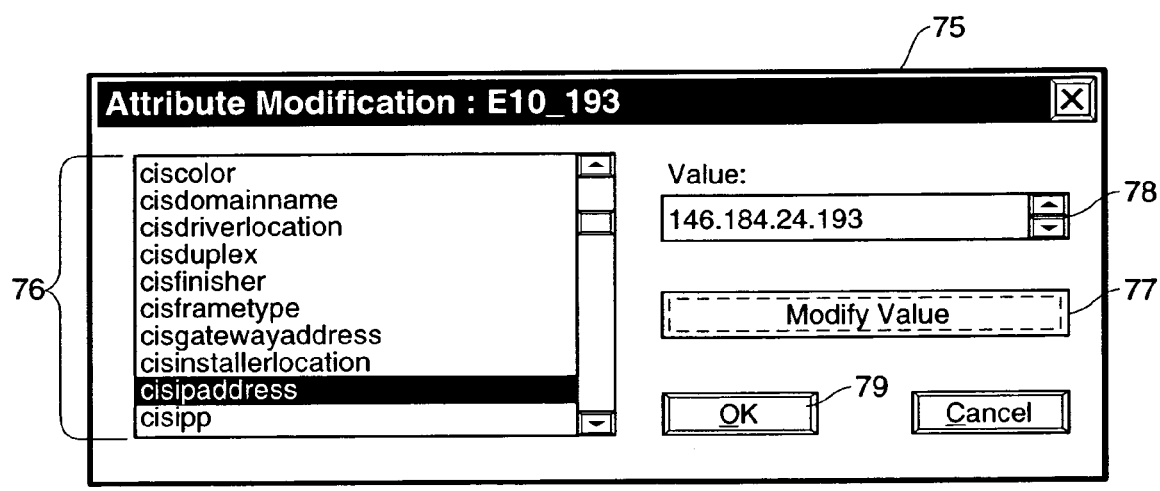
FIG. 8 depicts a window of a client side application program listing attributes of an object for changing attribute values of an object in a directory of a directory server.

A DELETE operation could also be performed in conjunction with a SEARCH operation. For instance, utilizing the LDAP client of FIG. 10, the user could select Directory Operations button 105 and select a SEARCH option from the cascading menu. The SEARCH option may display a window for the user to enter any search criteria such as an objectclass. For instance, the user could specify "objectclass=networkprinter", thereby performing a search for all objects in the directory that are network printers. FIG. 7 depicts window 70 which is an example of a window that provides a listing of all network printers that may result from such a search utilizing the LDAP client.

As seen in FIG. 7, window 70 provides listing 71 of the network printers. Window 70 also provides Edit button 73 that could be used to perform a MODIFY operation, and Delete button 72 that could be used to perform a DELETE operation. Once the search criteria have been specified and a listing of objects is provided to the user such as that shown in window 70, an object could be deleted by highlighting an object in listing 71 and selecting delete button 72.

The foregoing SEARCH option and listing of search results depicted in FIG. 7 could also be utilized for performing a MODIFY operation to change attribute values of an object. As described above, a SEARCH operation could be performed based on "objectclass=networkprinter", thereby obtaining listing 71 as shown in FIG. 7. The user could then highlight an object from listing 71 and select Edit button 73 to perform a MODIFY operation. Upon selecting Edit button 73, the LDAP client obtains the object's attribute values from the directory server and displays them in a listing, such as listing 76 shown in window 75 of FIG. 8. To change an attribute value using the LDAP client, the user highlights an attribute in listing 76 such as attribute cisipaddress and the value of the highlighted attribute is displayed in box 78. The user selects Modify Value button 77 in window 75 thereby changing box 78 from grey to white, meaning that the box is active for the user to enter a new value. The user enters the new value, which is temporarily stored in cache until the user selects OK button 79. Upon selecting OK button 79, an LDAPModification object OP_REPLACE option of the LDAP client commits the modification to the directory server.

Utilizing the native application of FIG. 11, the MODIFY operation could also be performed by highlighting an object in window 202 and selecting either Action button 205 or right clicking on the mouse to select a Properties option from the cascading menu. Upon selecting a Properties option from the cascading window, an attribute properties window, such as window 280 shown in FIG. 13 may be displayed. Window 280 may include box 281 for the user to select a property to view which provides a list 282 of the attributes (properties) for the highlighted object. The user then highlights a property to view, such as cipIPAddress 283. Upon highlighting an attribute, the native client obtains the attribute's value from the directory server and displays the value as depicted in box 284. If the user wants to change the value, he can enter a new value in box 285. However, the new value is not immediately committed to the directory server, but is temporarily stored in cache until the user commits the new value to the directory server by selecting either OK button 288 or Apply button 289. It should be noted that one difference between selecting OK button 288 and Apply button 289 is that selecting OK button 288 commits the new values to the directory server and closes window 280, whereas selecting Apply button 289 commits the new values to the directory server, but leaves window 280 active for the user to change the value of another attribute, if desired.

Figure 13:
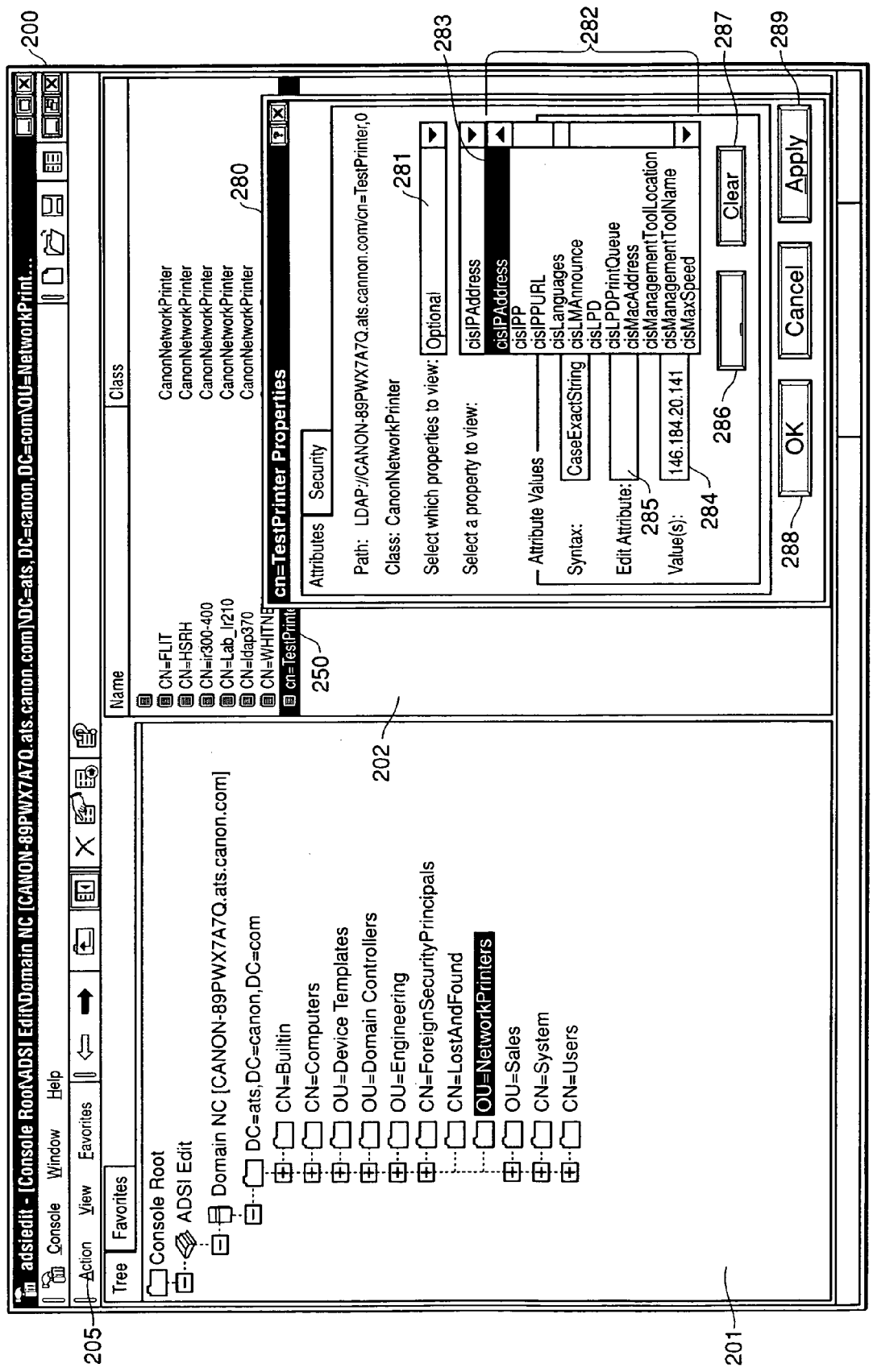
FIG. 13 depicts the window of FIG. 11 with a window for a user to perform a MODIFY operation.

As seen in FIG. 13, Set button 286 may be ghosted out, i.e. inactive. When the user clicks the mouse curser in box 285 in order to enter a new attribute value, Set button 286 becomes active so that the user can set a new value. When the user has entered the new value in box 285, he can select any of Set button 286, Apply button 289 or OK button 288. However, selecting Set button 286 does not commit the new value to the directory server and the user needs to select either Apply button 289 or OK button 288 in order to have the new value committed to the directory server.

Thus, according to the foregoing description, ADD, DELETE, MODIFY and SEARCH operations can be performed in the directory server utilizing an LDAP client or a native application. Once the changes have been made and committed to the directory server, the directory server notifies a plug-in corresponding to the type of change, whereby the plug-in generates a change information packet and multicasts it to a multicast group designated to receive the packet with registered members of the multicast group receiving the multicast packet.

A description will now be made of a client application receiving multicast messages from the directory server plug-in. The client application does not have to be connected to the directory server in order to receive the multicast messages. Instead, it uses the Windows Socket and a User Datagram Protocol (UDP) for receiving messages from the directory server plug-in. The client application program creates a Windows Socket for each of the operations: ADD, DELETE, MODIFY and SEARCH. It then registers each socket into the a different multicast group corresponding to each operation. When changes are made in the directory server, the socket is notified if any messages are received. The client application program may also parse the messages to check whether the operation performed on the directory server was successful or if it failed.

Figure 9:
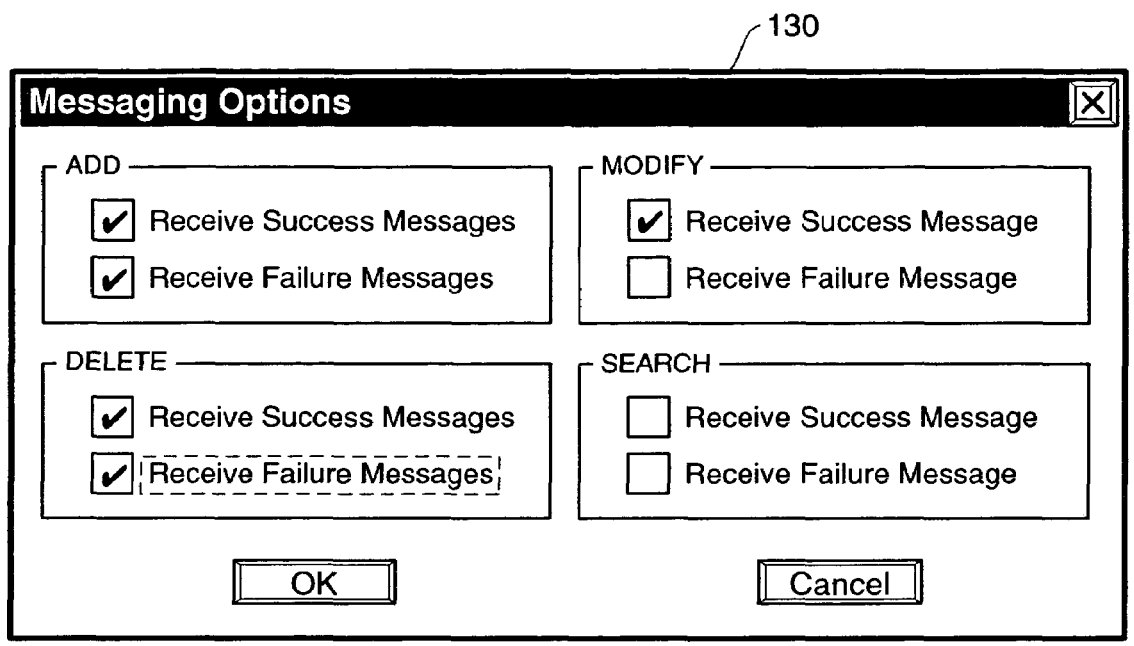
FIG. 9 depicts a window of an client application program for setting options for receiving multicast messages from a directory server.

FIG. 9 depicts window 130 which may be used for setting message receiving options in the client application program. It should be noted that the client application receives all multicast messages that the directory server plug-in has been configured to multicast (configuring the plug-in is described in more detail below). That is, the client application registers the windows socket with the multicast group and all messages sent to the multicast group by the directory server plug-in are forwarded to the registered members of the multicast group. Accordingly, although the following discussion of window 130 relates to setting message receiving options, the message receiving options refers to parsing out any unwanted messages that are received by the client application and discarding them, while performing further processing on the messages that the client has been set to receive. As seen in window 130, the client application can be set to receive any of the ADD, DELETE, MODIFY and/or SEARCH multicast packets and can also be set whether to only process successful messages, failure messages or both. Therefore, the settings depicted in FIG. 9 would result in further processing by the client application of successful or failed ADD and DELETE messages and successful MODIFY messages, while discarding all SEARCH messages and failed MODIFY messages.

As stated above, the directory server plug-in is configured to generate and multicast the information packets. In this regard, the plug-in may be configured for generating information packets only for specific objects within the directory server. That is, rather than a plug-in generating an information packet for all changes made to all objectclasses in an entire directory server, the plug-in could be configured to generate information packets only for changes made to a specified objectclass of the directory server. Further, the plug-in could be configured to only generate information packets for a specified operation, i.e. only for ADD or MODIFY operations, performed within the selected objectclass. Configuring the plug-in in this manner provides a way for network administrators to limit the multicast messages generated by the directory server plug-in to only those that he wants to receive. By way of example, consider the directory structure depicted in FIG. 16.

Figure 16:
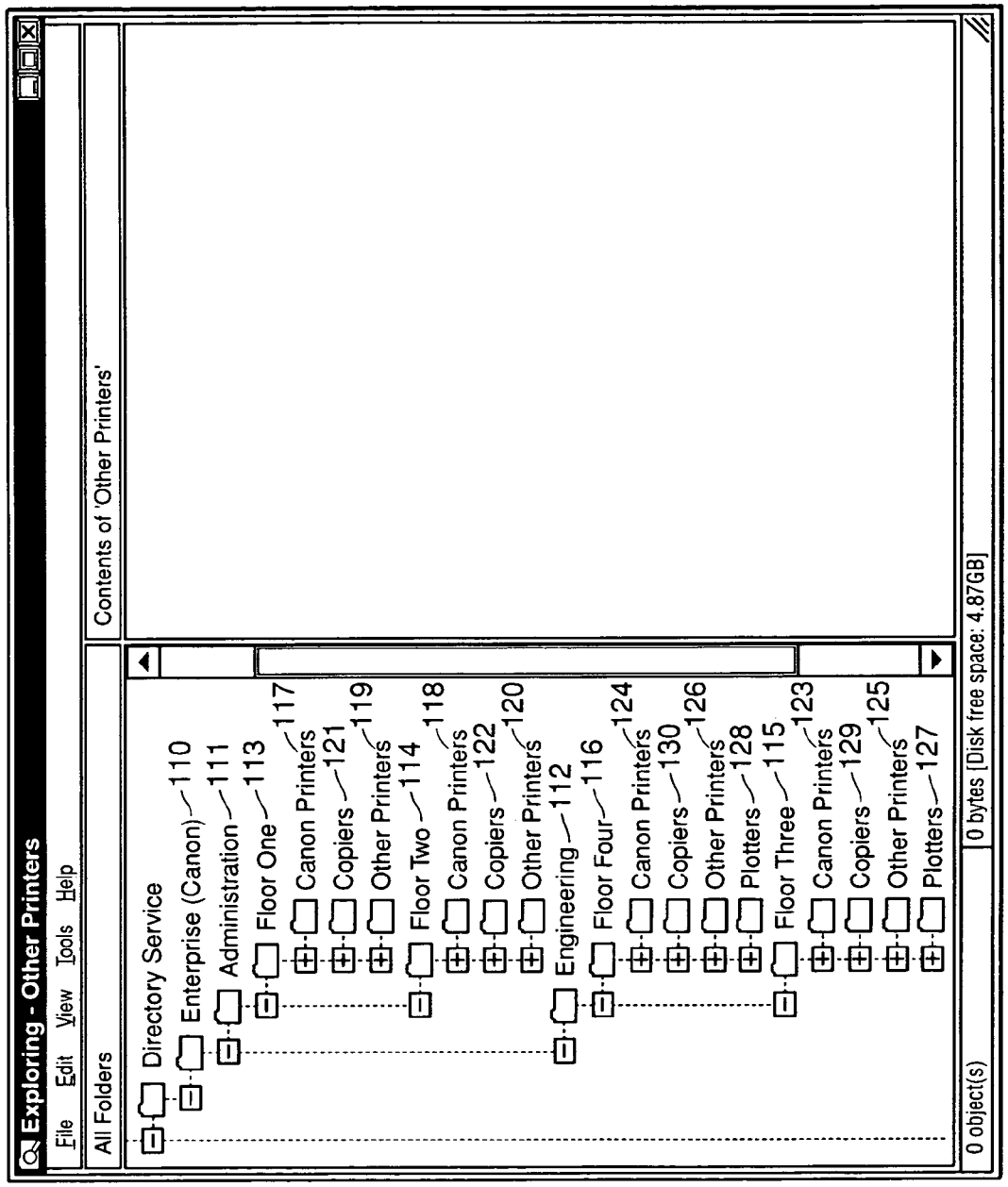
FIG. 16 depicts a window showing an example of a directory structure.
Figure 17:
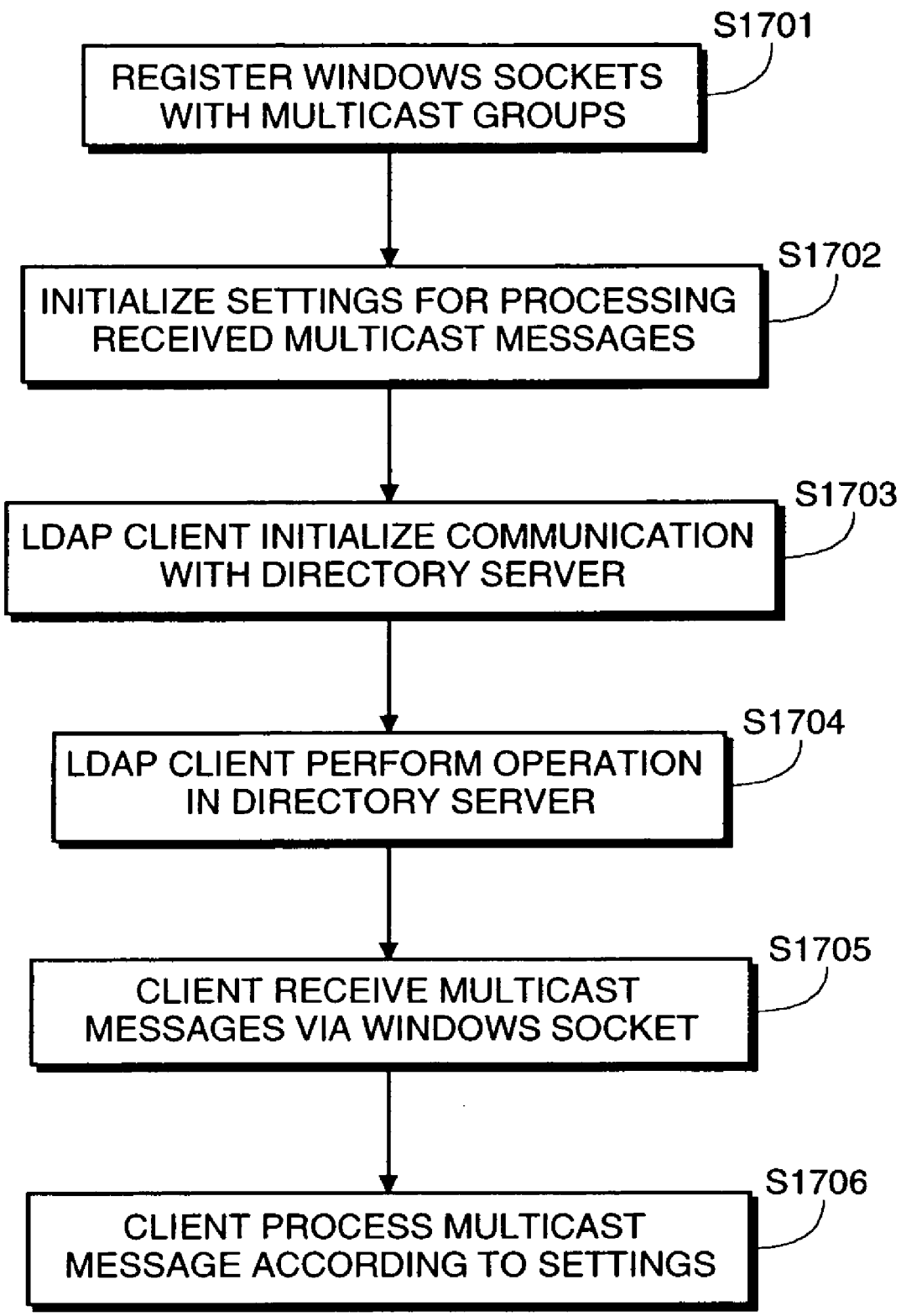
FIG. 17 is a flowchart of process steps of a client side application.

In this example, a network administrator only wants to track changes made to Canon printers on the third floor of a building occupied by an engineering organization. As seen in FIG. 16, the top level of the directory tree may be Enterprise 110 (such as Canon) which includes subdirectories Administration 111 and Engineering 112. Administration 111 corresponds to an administration organization within the Canon enterprise and Engineering 112 corresponds to an engineering organization within the Canon enterprise. The administration organization may occupy two floors of a building (floor one 113 and floor two 114) and the engineering organization may also occupy two floors (floor three 115 and floor four 116) of the same building. Of course, each organization could also occupy multiple floors of separate buildings and the directory structure could still appear as shown in FIG. 17. Floors 113 and 114 of Administration 111 include subdirectories Canon Printers 117 and 118, Other Printers 119 and 120, and Copiers 121 and 122, respectively. Similarly, Floors 115 and 116 of Engineering 112 include subdirectories Canon Printers 123 and 124, Other Printers 125 and 126, Plotters 127 and 128, and Copiers 129 and 130.

FIG. 16 depicts a rather simple directory structure in which an enterprise contains only two organizations. However, it can be readily understood that an enterprise may be a corporate level with subdirectories for each subsidiary company located around the world. Each subsidiary company could include numerous divisions of the subsidiary. Each division may include numerous administrative units such as the foregoing administration and engineering organizations. The administration organization may be further comprised of numerous departments, such as accounting, human resources, management, etc. and the engineering organization may be comprised of numerous groups such as mechanical, electrical, computer technology, materials and processes, manufacturing, etc. Each of these units could further comprise sub-units.

Therefore, it is apparent that the directory structure could be extremely large and if a plug-in were not configured to provide for limiting the number of multicast packets generated by the plug-in, a network administrator may be inundated with messages that he may not want to receive. That is, the network administrator may not want to receive messages about changes to each and every organization or object within the directory tree, but may only want to receive messages about changes within a specific unit. For instance, a network administrator may be assigned to maintain Canon Printers 123 within Engineering 112 shown in FIG. 16 with a different network administrator being assigned to Administration 111. Therefore, the plug-in is preferably configured to only generate change information packets for which the client wants to track.

The foregoing description describes the functionality of a user making changes in a directory server and a client application receiving multicast messages. The following is a description of some software functions that may be utilized for accomplishing the foregoing operations.

Software Functions

The following is a listing of software functions that may be utilized for practicing the invention. The listing is by no means exhaustive and other functions may be employed to provide additional functionality in the invention. Additionally, the following functions are specific to Netscape Directory Server and other functions may be provided for to be implemented in other directory server applications.

Client Side Software Funtions

The following software functions may be incorporated in a client application program. The functions listed below provide for a client processing multicast messages received by the client that have been multicast by the directory server plug-in. The functions listed below have particular applicability to Netscape Directory Server, however similar functions could be implemented in other directory server client applications and the invention is not limited to Netscape Directory Server.

void CClientView::OnDirMessage( )

This function is used to set the options for the operation messages received from the directory server. According to the option selected in the dialog box, the client becomes a member or opts out of the appropriate multicast group. This function also creates a listbox if it was not created previously for displaying the messages.

void CClientView::Cleanup(int flag)

This function cleans up the socket on which no more messages are to be received. The input parameter flag indicates which socket is to be closed.

void CClientView::OnAddmessageReceive( )

This function is called when the client has registered itself in the multicast group for the ADD operation. In this function, the message is received and decoded to check whether the message is a failure or success message. If the user wants the message to be displayed, it is added to the listbox.

BOOL CClientView::InitializeAddSocket( )

This function creates the socket for receiving messages from the directory server for the ADD operation. This function adds this socket into the member list of the multicast group for ADD operation.

BOOL CClientView::InitializeDeleteSocket( )

This function creates the socket for receiving messages from the directory server for the DELETE operation. This function adds this socket into the member list of the multicast group for DELETE operation.

BOOL CClientView::InitializeModifySocket( )

This function creates the socket for receiving messages from the directory server for the MODIFY operation. This function adds this socket into the member list of the multicast group for MODIFY operation.

BOOL CClientView::InitializeSearchSocket( )

This function creates the socket for receiving messages from the directory server for the SEARCH operation. This function adds this socket into the member list of the multicast group for SEARCH operation.

Void CClientView::OnDeleteMessageReceive( )

This function is called when the client has registered itself in the multicast group for the DELETE operation. In this function, the message is received and decoded to check whether the message is a failure or success message. If the user wants the message to be displayed, it is added to the listbox.

void CClientView::OnModifyMessageReceive( )

This function is called when the client has registered itself in the multicast group for the MODIFY operation. In this function, the message is received and decoded to check whether the message is a failure or success message. If the user wants the message to be displayed, it is added to the listbox.

void CClientView::OnSearchMessageReceive( )

This function is called when the client has registered itself in the multicast group for SEARCH operation. In this function, the message is received and decoded to check whether the message is a failure or success message. If the user wants the message to be displayed, it is added to the listbox FIG. 17 is a flowchart of process steps of a client application making changes in a directory server, and receiving multicast messages. In the flowchart of FIG. 17, it is assumed that the client application is setup to allow a user to make changes in a directory server and also to receive multicast messages. Of course, as described above, the client application could be setup to only perform one or the other and not both. In FIG. 17, steps S1701, S1702, S1705 and S1706 relate to receiving multicast messages and therefore, if the client is setup to only allow a user to make changes in the directory server and not to receive multicast messages, then these steps may be omitted. Of course, if the client is setup to only receive messages and not to allow a user to make changes in the directory server, then the remaining steps (S1703 and S1704) could be omitted.

As seen in FIG. 17, in step S1701, the client initializes and registers a Windows socket for each type of change operation that the client wants to track. For example, if the client wants to track ADD, DELETE, MODIFY and SEARCH operations, the client initializes and registers a separate Windows socket for each operation. The client registers the Windows socket with a multicast group corresponding to the change type. The multicast group IP address is setup by a network administrator.

In step S1702, the client initializes settings for processing received multicast messages. That is, when the client receives a multicast message, the message is processed based on specified settings. An example of a setting is parsing messages based on the result of the operation. The client may be set to only provide notification of a change if the change was successful and to discard or merely log, but not provide notification, if the change operation failed. Of course, other settings may be made and the types of settings included may vary based on the client application.

In step S1703, when a client makes a change in the directory server, the client initializes LDAP communication with the directory server. Once the communication is established, the client, utilizing the MFC classes described above with regard to FIG. 3, provides a graphical interface for a user at the client to perform changes in the directory server. After the client makes a change in the directory server, a multicast message is generated by the directory server plug-in and the plug-in multicasts the message to a multicast IP address corresponding to the type of change. Generating multicast messages and multicasting by the directory server plug-in are described below.

The multicast message is then received by the multicast group members who have registered with the multicast group. Thus, in step S1705, the multicast message is received by the client since the client has registered a Windows socket with the multicast group. When the message is received, the client processes the message based on the settings setup in step S1702.

Thus, the client application registers with a multicast group, makes changes in the directory server, and receives multicast messages that are multicast by the directory server plug-in once the change has been made. A description will now be made of the directory server functionality.

Directory Server Side Functions

The directory server functions described below refer to functions having particular applicability to Netscape Directory Server. However, as stated above, the invention is not limited to Netscape Directory Server and functions similar to those described below could be implemented in any other directory server application program.

The directory server side functions generally comprise three components: initialization function, post-operation plug-ins, and server configuration.

The first component is the initialization function. The initialization function generally performs the following operations: 1) specify the plug-in version, 2) specify information about the plug-in, such as a description of what the plug-in does, 3) register the plug-in functions with the directory server, 4) initialize a Window socket for sending a multicast packet, and 5) return a value to the directory server whether the operation was a success or failure.

The initialization function may comprise the following:

int Plugin_Initialization (Slapi_PBlock*pb).

The directory server passes a single argument type Slapi_PBlock*pb when calling the initialization function. On a Windows NT environment, the initialization function is exported and specified in the .def file. The export may be as follows:

_declspec(dllexport)int Plugin_Initialization (Slapi_PBlock*pb).

The second component is the post-operation plug-in functions. The post-operation plug-in functions are called after an LDAP operation is performed in the directory server. The directory server is setup during the initialization stage to call the plug-in functions after the appropriate LDAP operation is performed. Each function corresponds to an ID in the parameter block (Slapi_Pblock*pb). In the initialization stage, the name of the function that corresponds to the operation ID is specified. The following post-operation plug-in functions are generally supported in Netscape Directory Server.

int Postop_Add(Slapi_Pblock*pb)

This specifies the function called after an LDAP add operation is performed in the directory server. The ID corresponding to this function is SLAPI_PLUGIN_POST_ADD_FN.

int Postop_Delete(Slapi_Pblock*pb)

This specifies the function called after an LDAP delete operation is performed in the directory server. The ID corresponding to this function is SLAPI_PLUGIN_POST_DELETE_FN.

int Postop_Modify(Slapi_Pblock*pb)

This specifies the function called after an LDAP modify operation is performed in the directory server. The ID corresponding to this function is SLAPI_PLUGIN_POST_MODIFY_FN.

int Postop_Search(Slapi_Pblock*pb)

This specifies the function called after an LDAP search operation is performed in the directory server. The ID corresponding to this function is SLAPI_PLUGIN_POST_SEARCH_FN.

When each of the above functions are called after the corresponding LDAP operation is performed, they get the DN information (Distinguished Name of the operation, e.g. ADD, DELETE, MODIFY, SEARCH) and the result of the operation (whether the operation was a success or failure). The data (DN and result or any other information) is then sent as a multicast packet on the Windows socket which was initialized during the initialization stage. An entry is also made in a log file in the directory server to track the changes and the multicast packets sent out by the directory server. The log entries can be used for debugging purposes, if necessary.

The third component is the directory server configuration. This refers to configuring the directory to load the plug-ins on startup. To configure the server, the server's configuration file is edited. For Netscape Directory Server, the slapd.conf server configuration file is edited if using Netscape Directory Server 3.x, and the slapd.ldbm.conf server configuration file is edited if using Netscape Directory Server 4.0. A directive is added to the configuration file to load the library Plug_in_d.dll to call the initialization function PlugIn_Initialization( ) on startup. For Netscape Directory Server 3.x, the directive added to the configuration file may be plugin postoperation/usr/Plugin_in_d.dll PlugIn_Initialization. For Netscape Directory Server 4.0, the directive added to the configuration file may be plugin postoperation on "CIS printer postoperation"/usr/Plugin_in_d.dll PlugIn_Initialization. Thus, by adding a directive to the server configuration file, on startup of the server, the plug-ins are loaded.

Figure 18:
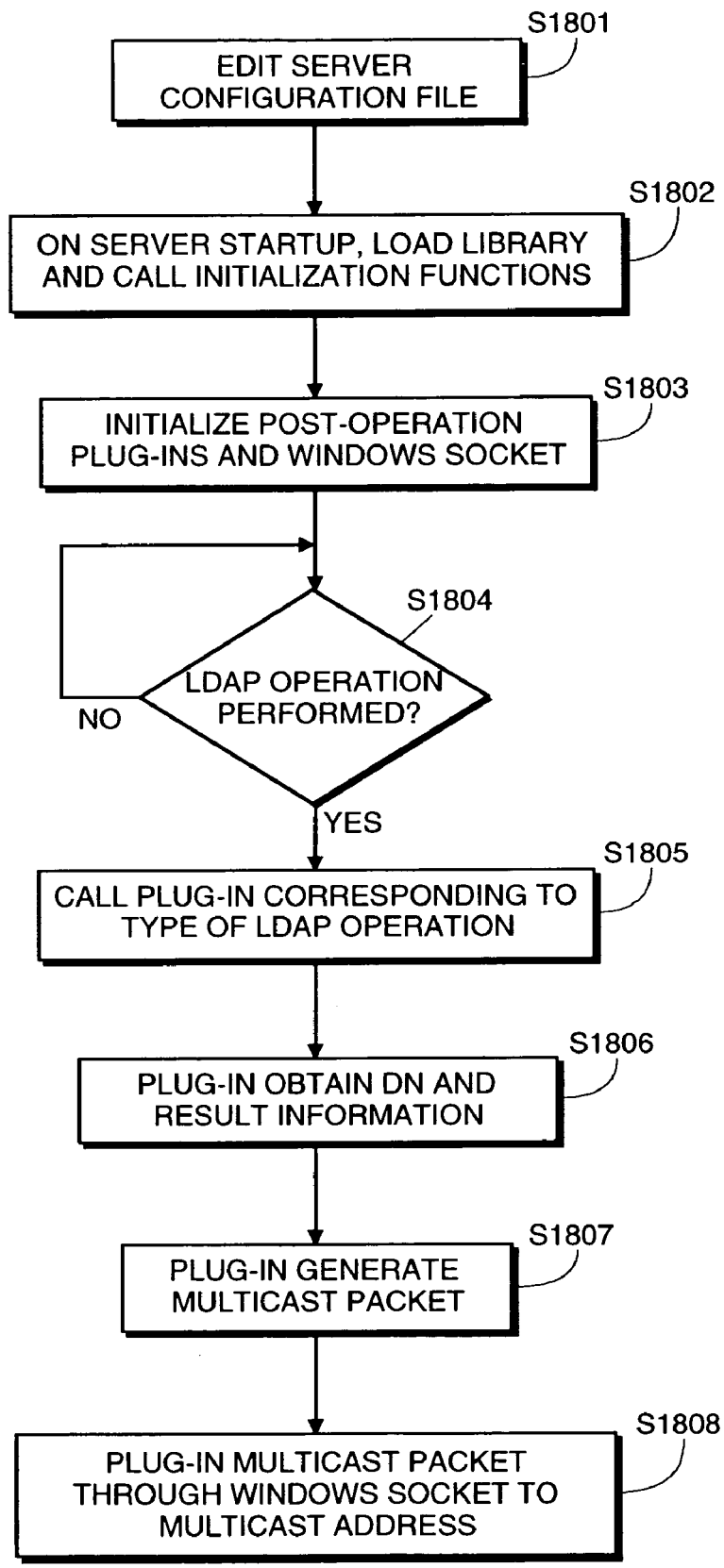
FIG. 18 is a flowchart of process steps of a server side application.

FIG. 18 is a flowchart depicting the steps for a directory server plug-in to generate and multicast an information packet when a change is made in the directory server. As seen in FIG. 18, in step S1801 the server's configuration file is edited to add a directive to load the plug-in functions on startup. In step S1802, on startup of the server, the library containing the plug-ins is loaded and initialization functions for each plug-in are called to initialize the plug-ins. In step S1803, the post-operation plug-ins are initialized. Additionally, a Windows socket corresponding to each plug-in is initialized for multicasting an information packet.

Once the server has been configured and the plug-ins and Windows sockets have been initialized, the server is ready and waits for an LDAP client application to initialize communication with the directory server and to perform an LDAP operation. If an LDAP operation (ADD, DELETE, MODIFY, SEARCH) is performed in the directory server (step S1804), then the appropriate plug-in corresponding to the type of LDAP operation is called by the directory server (step S1805). The plug-in then obtains the DN (Distinguished Name) and result of the LDAP operation (step S1806) and generates a multicast information packet (step S1807). Once the multicast packet has been generated by the plug-in, the plug-in sends the multicast packet via the Windows socket corresponding to the plug-in to a multicast IP address (group) corresponding to the type of LDAP operation. The multicast packet is then received by the multicast group members (client applications) who have registered with the multicast address.

Thus, as depicted in FIG. 18, clients can track changes made in a directory server without having to maintain a connection with the directory server. Rather, clients receive change information by registering as a member of a multicast group, where change information packets are generated by plug-ins in the directory server and multicast to a multicast group whereby registered members of the multicast group receive them.

EXAMPLES

The following discussion provides examples of a user making changes in a directory server using an LDAP client application or a native application, and a client application receiving multicast messages multicast by a directory server plug-in.

Example 1

ADD Operation

The present example will be described with reference to FIGS. 1, 3 to 6, 10 and 14. In this example, a user makes changes in directory server 30 (FIG. 4) of server 11 via an LDAP client application (FIG. 3) in client 13, and a network administrator receives multicast messages about changes made in directory server 30 via client application 41 on client/administrator 15. Directory server 30 has been configured with ADD, DELETE, MODIFY and SEARCH plug-ins that multicast messages to multicast groups 35 to 38 having IP addresses 225.6.7.8, 225.6.7.9, 225.6.7.10 and 225.6.7.11, respectively. Client application 41 on client/ administrator 15 has registered with each of the foregoing multicast groups to receive messages multicast to each group.

FIG. 10 depicts window 100 which may be displayed on a display of client 13. In order to have window 100 displayed, a user at client 13 activates the LDAP client application and configures the directory server objectclass as described with regard to FIG. 5. After having configured the server, the LDAP client establishes communication with directory server 11, thus displaying window 100. Window 101 of window 100 depicts the objectclass designated in the configuration and window 102 depicts the objects contained within the designated objectclass.

FIG. 10 may also be displayed on a display of client/administrator 15. In order to have window 100 displayed, the network administrator activates the LDAP client application program running on client/administrator 15. In the same manner as described above, the LDAP client application on client/administrator 15 establishes communication with directory server 30 and window 100 is displayed. Window 100 displayed on client/administrator 15 depicts the same directory server objectclass and objects as seen on client 13.

The user at client 13 wants to add a new printer (called "TestPrinter") to the directory OU=NetworkPrinters. To add the new printer, the user selects Directory Operations button 105 in window 100 which displays a cascading menu with options for the user to select, including an ADD option. The user selects the ADD option from the cascading menu, thereby activating window 60 as seen in FIG. 6. As previously described, any required attribute values for the new object are retrieved from the directory server. The user enters the name "TestPrinter" in Name box 65 and selects OK button 66 to have the new printer committed to the directory server. Upon selecting OK button 66, the new printer is added to the objectclass.

Upon committing the new printer to the directory server, the ADD plug-in in directory server 30 is called and performs a post-operation procedure to generate an information packet containing information about the added printer. The ADD plug-in multicasts the generated information packet to multicast IP address 225.6.7.8 (the multicast IP address corresponding to ADD messages).

After the information packet is multicast to IP address 225.6.7.8, the information packet is received by registered member of multicast group 225.6.7.8, one of which is the client application running on client/administrator 15. Upon receiving the multicast message, the client application program processes the message according to set options. These processes may include displaying a message in a pop-up window, storing the message in a log file, or generating an email message and sending it to a specified email address. Additionally, the client application program could be set to merely refresh the display of the current directory server configuration in window 100. In the present example, this latter option has been set in the client application.

At a time immediately after the change was committed to the directory server by the LDAP client application, and before client/administrator 15 receives the multicast message, the client application on client/administrator 15 appears as window 100 shown in FIG. 10. However, after having received the multicast message, window 100 is refreshed and appears as window 300 seen in FIGURE 14. As can readily be seen, TestPrinter 350 that was added by the LDAP client application program of client 13 is now reflected in the client application program of client/administrator 15 as being included in the directory server objectclass.

As stated above, client application 41 in client/administrator 15 could be set to initiate a pop-up window, to log the multicast messages or to generate an email message. In each of these cases, client application 41 does not have to be active as described above in order for the network administrator to receive the change information. That is, the foregoing example provided a description where client application 41 had established communication with directory server 30 and received the multicast message, whereby window 100 was refreshed to reflect the change. However, in a case where client application 41 is not active and has been set to process the message by a pop-up window, logging the message or generating an email, the network administrator could track the changes without client application 41 being active.

Thus, the network administrator is able to track changes made in the directory server without having to maintain a constant connection with the directory server. That is, the administrator is able to track changes merely by registering as a member of a multicast group that has been designated to receive change information packets generated by the directory server plug-in.

Of course, the same ADD operation could have been made by a native application program rather than an LDAP client. In this case, the native application may appear as seen in FIG. 11 and the user could add an object "TestPrinter" as described with reference to FIG. 12. Once the change has been committed to the directory server, window 200 of the native application would appear as window 400 shown in FIG. 15. Additionally, the ADD plug-in would generate a multicast information packet and multicast it to the ADD multicast group, whereby it would be received by client 41 in client/administrator 15. If client 41 is active and has been set to refresh the display, then again window 100 would be refreshed to appear as window 300 in FIG. 14.

Example 2

MODIFY Operation

In the present example a user makes changes in directory server 30 via a native application program running on server 11 and a network administrator receives multicast messages about changes made in directory server 30 via client application 41 running on client/administrator 15. Again, directory server 30 has been configured with ADD, DELETE, MODIFY and SEARCH plug-ins that multicast messages to IP addresses 225.6.7.8, 225.6.7.9, 225.6.7.10 and 225.6.7.11, respectively. Additionally, client application 41 in client/administrator 15 has registered with each of the foregoing multicast IP addresses to receive messages multicast to each address.

Figure 15:
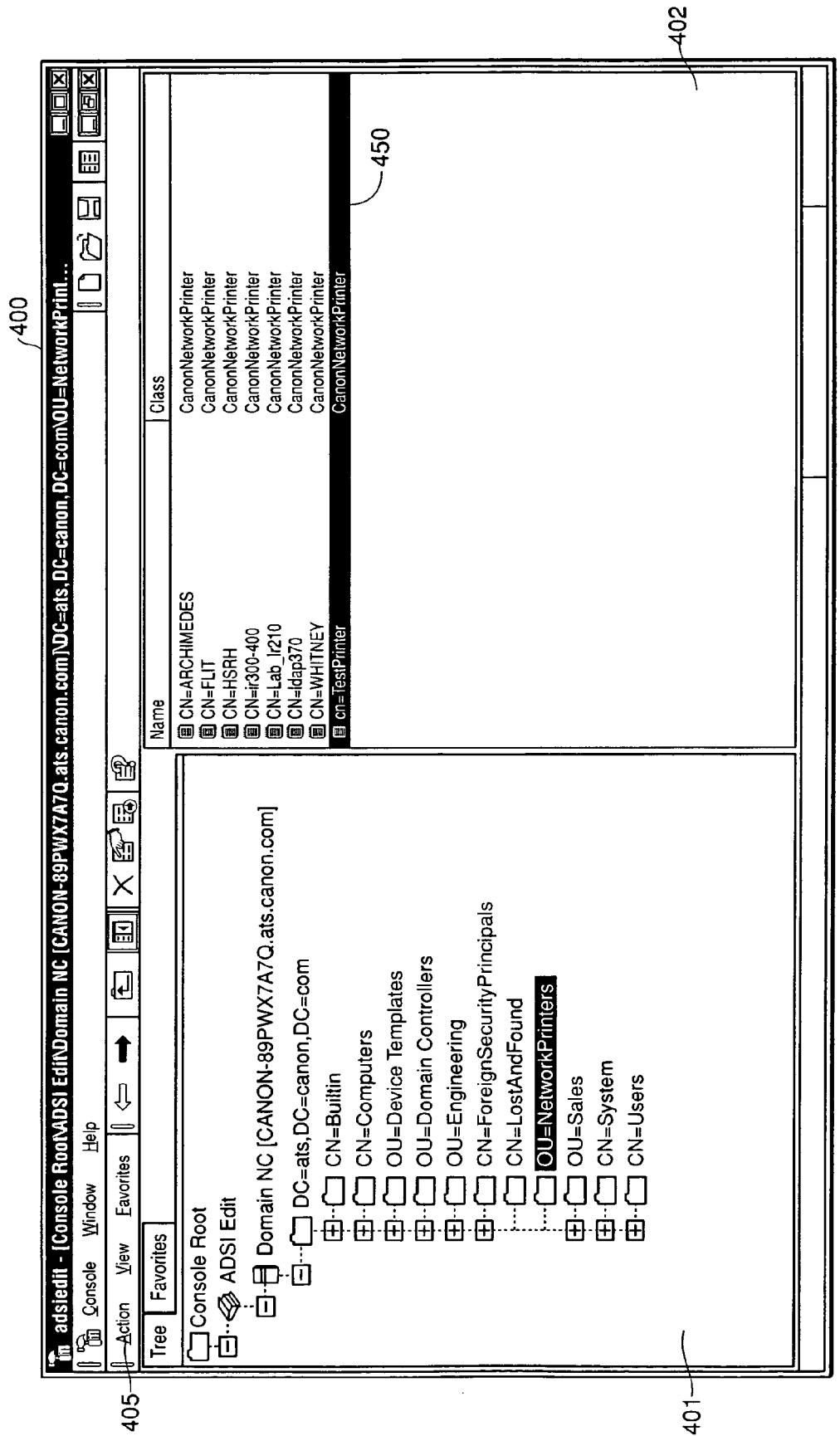
FIG. 15 depicts the window of FIG. 11 after an object TestPrinter has been added.

In this example a user, utilizing a native application, wants to modify an attribute value of the TestPrinter added in example 1. The user activates the native application which depicts window 400 as shown in FIG. 15. To modify an attribute value, the user highlights TestPrinter 450 in FIG. 15 and selects Action button 405. A cascading menu is displayed that provides options for the user to select from, one of which is a MODIFY option. Upon selecting the modify option, window 280 (as shown in FIG. 13) is displayed which includes listing 282 of attributes (properties) for TestPrinter 450. The user selects an attribute from listing 282 and enters the new value in box 285. The new value is not committed to the directory server at this time, but is temporarily stored in cache until the user selects OK button 288 or Apply button 289. Upon selecting either of buttons 288 or 289, the new attribute value is committed to the directory server, thereby activating the MODIFY plug-in in directory server 30 to perform a post-operation procedure to generate a multicast information packet and to multicast it to IP address 225.6.7.10 (the IP address corresponding to MODIFY changes).

Since client application 41 in client/administrator 15 has registered as a member of multicast group 225.6.7.10, it receives the multicast information packet and processes it according to pre-set options. In the present example, client application 41 has been set to store multicast messages relating to MODIFY operations in a log file. Therefore, when client application 41 receives the multicast packet, it merely stores the information in a log file, whereby the network administrator can review the change information at a later time.

Example 3

DELETE Operation

A delete operation is performed in the present example in the same environment as described above with regard to example 1. Therefore, a description of the environment has not been repeated here.

A delete operation will now be described with regard to a user at client 13 wanting to delete the previously added TestPrinter from the directory server.

Figure 14:
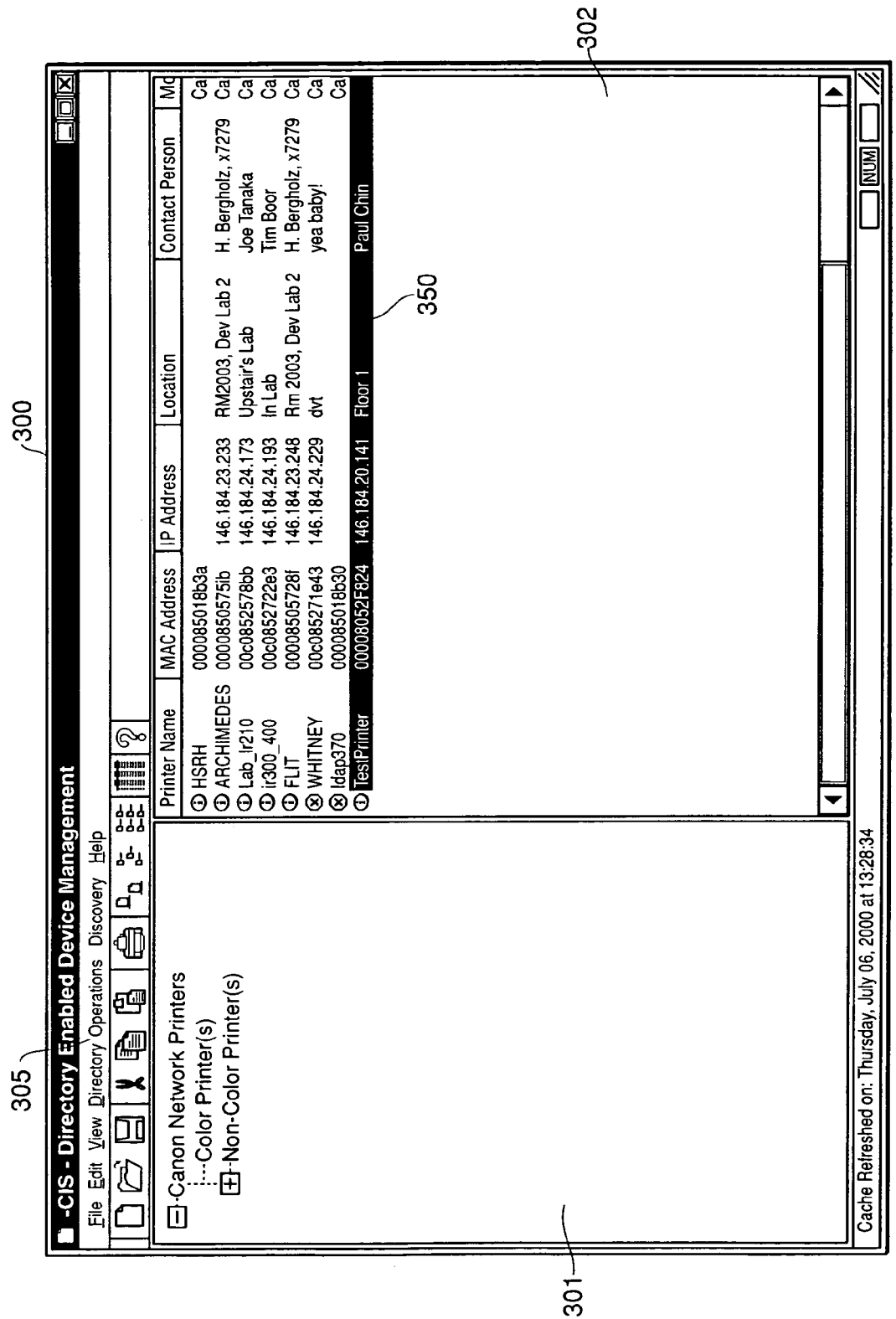
FIG. 14 depicts the window of FIG. 10 after an object TestPrinter has been added.

FIG. 14 depicts the directory server as seen in both LDAP client 13 and client/administrator 15 before TestPrinter is deleted. To delete the TestPrinter 350, the user at LDAP client 13 highlights TestPrinter 350 in window 302 and selects Directory Operations button 305, thereby activating a cascading menu that provides options for the user to select from, including a DELETE option. Upon selecting the delete option, TestPrinter 350 is deleted from the objectclass.

Upon comitting the delete operation to the directory server, the DELETE plug-in in directory server 30 performs a post-operation procedure to generate a multicast information packet about the delete operation and multicasts it to IP address 225.6.7.9 (the IP address for DELETE operations).

Since client application 41 of client/administrator 15 has registered as a member of IP address 225.6.7.9, it receives the multicast message and processes it according to pre-set options. In the present example, client application 41 has been set to refresh window 300 to reflect delete changes. Accordingly, upon receiving the multicast message, window 300 shown in FIG. 14 is refreshed to appear as window 100 as seen in FIG. 10. As can readily be seen, the deletion of TestPrinter 350 has been reflected in window 100.

As can be seen from the above examples, an LDAP client application program can make changes in a directory server. A plug-in in the directory server is called when the change is committed to the directory server. The plug-in generates a multicast information packet containing information about the type of change made by the LDAP client. The plug-in then multicasts the information packet to a multicast IP address corresponding to the type of change. Clients who have registered as members of the multicast group that the plug-in multicasts the information packet to receive the information packet. Upon receiving the information packet, the client application processes the packet based on settings within the client application. Therefore, network administrators can track changes made in directory servers merely by registering as a member of a multicast group and they do not have to maintain a constant connection with the directory server in order to obtain change information.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for multicasting changes made in a directory server which contains information within a directory and makes a change to the information in the directory in accordance with a directory change operation, comprising the steps of:

establishing plural multicast groups, each multicast group corresponding to a respective change category for a type of change made to the directory in the directory server; and submitting change information responsive to a change being made to the directory in the directory server, the change information being submitted to each member which belongs to a selected one of the plural multicast groups corresponding to the change category for the type of change made to the directory in the directory server.

2. A method according to claim 1, wherein the change information is submitted to the multicast group utilizing a connectionless protocol.

3. A method according to claim 1, wherein each of the plurality of change categories correspond to an add, delete, modify or search change.

4. A method according to claim 1, wherein changes made in the directory server are performed utilizing a Lightweight Directory Server Protocol.

5. A method according to claim 1, wherein change information is submitted for multicast by a plug-in that extends capabilities of the directory server.

6. A method according to claim 5, wherein the plug-in generates information packets based on changes made in the directory server, and submits the information packets to the multicast groups.

7. A method according to claim 1, wherein a client registers with at least one of the plural multicast groups in order to obtain the change information corresponding to each multicast group for which the client has registered.

8. A method according to claim 7, wherein the client registers with multicast groups established for a plurality of directory servers.

9. A method for obtaining change information from a directory server which contains information within a directory and which makes a change to the information in the directory in accordance with a directory change operation, comprising the steps of:

registering as a member of at least one of a plurality of multicast groups, each of the plurality of multicast groups corresponding to a respective change category for a type of change made to the directory in the directory server; and receiving from the directory server, change information submitted to each member which belongs to the multicast group corresponding to the change category for the type of change made to the directory in the directory server.

10. A method according to claim 9, wherein the member registers with multicast groups established for a plurality of directory servers.

11. A method according to claim 9, wherein the member registers with at least one multicast group corresponding to add, delete, modify or search change categories.

12. An apparatus for multicasting changes made in a directory server which contains information within a directory and which makes a change to the information in the directory in accordance with a directory change operation, wherein plural multicast groups are established such that each multicast group corresponds to a respective change category for a type of change made to the directory in the directory server, comprising:
a processor for executing executable process steps; and
a memory medium storing executable process steps, wherein the executable process steps comprise (a) generating change information responsive to a change being made to the directory in the directory server, wherein the change information corresponds to the type of change made to the directory, and (b) submitting the change information to each member which belongs to a selected one of the plural multicast groups corresponding to the change category for the type of change made to the directory in the directory server.

13. Computer-executable process steps stored on a computer-readable medium which, when executed by a computer, cause the computer to multicast changes made in a directory server which contains information in a directory and which makes a change to the information in the directory in accordance with a directory change operation, wherein plural multicast groups are established such that each group corresponds to a respective change category for a type of change made to the directory in the directory server, the computer-executable process steps comprising:
generating change information responsive to a change being made to the directory in the directory server, wherein the change information corresponds to the type of change made to the directory; and
submitting the change information to each member which belongs to a selected one of the plural multicast groups corresponding to the change category for the type of change made to the directory in the directory server.

14. Computer-executable process steps according to claim 13, wherein the change information is submitted to the multicast group utilizing a connectionless protocol.

15. Computer-executable process steps according to claim 13, wherein each of the plurality of change categories correspond to add, delete, modify or search.

16. Computer-executable process steps according to claim 13, wherein changes made in the directory server are performed utilizing a Lightweight Directory Server Protocol.

17. Computer-executable process steps according to claim 13, wherein the process steps comprise a plug-in for extending capabilities of the directory server.

18. Computer-executable process steps according to claim 13, wherein a client registers with at least one of the plural multicast groups in order to obtain the change information corresponding to each multicast group for which the client has registered.

19. Computer-executable process steps according to claim 18, wherein the client registers with multicast groups established for a plurality of directory servers.

20. Computer executable process steps stored on a computer-readable medium which, when executed by a computer, cause the computer to obtain change information from a directory server which contains information in a directory and which makes a change to the information in the directory in accordance with a directory change operation, the computer-executable process steps comprising:
registering as a member of at least one of a plurality of multicast groups, wherein each of the plurality of multicast groups corresponds to a respective change category for a type of change made to the directory in the directory server; and
receiving, from the directory server, change information submitted to each member which belongs to the multicast group corresponding to the change category for the type of change made to the directory in the directory server.

21. Computer executable process steps according to claim 20, wherein the member registers with multicast groups established for a plurality of directory servers.

22. Computer executable process steps according to claim 20, wherein the member registers with at least one multicast group corresponding to add, delete, modify or search change categories.

23. A method for providing notification of changes made in a directory server which contains information in a directory and which makes a change to the information in the directory in accordance with a directory change operation, comprising the steps of:
establishing plural groups each corresponding to a respective change category for a type of change made to the directory in the directory server; and
in response to a change being made to the directory in the directory server, providing notification of the change to each member which belongs to a selected one of the plural groups that corresponds to the change category for the type of change made to the directory in the directory server.

24. A method according to claim 23, wherein the plurality of change categories correspond to different directory change operations.

25. Computer-executable process steps stored on a computer-readable medium which, when executed by a computer, cause the computer to provide notification of changes made in a directory server which contains information in a directory and which makes a change to the information in the directory in accordance with a directory change operation, the process steps comprising the steps of:
establishing plural groups each corresponding to a respective change category for a type of change made to the directory in the directory server; and
in response to a change being made to the directory in the directory server, providing notification of the change to each member which belongs to a selected one of the plural groups that corresponds to the change category for the type of change made to the directory in the directory server.

26. Computer-executable process steps according to claim 25, wherein the plurality of change categories correspond to different directory operations.

* * * * *